March 6, 1962 A. R. CRAWFORD 3,023,613
ENGINE ANALYZER AND BALANCER
Filed July 13, 1955 13 Sheets-Sheet 1
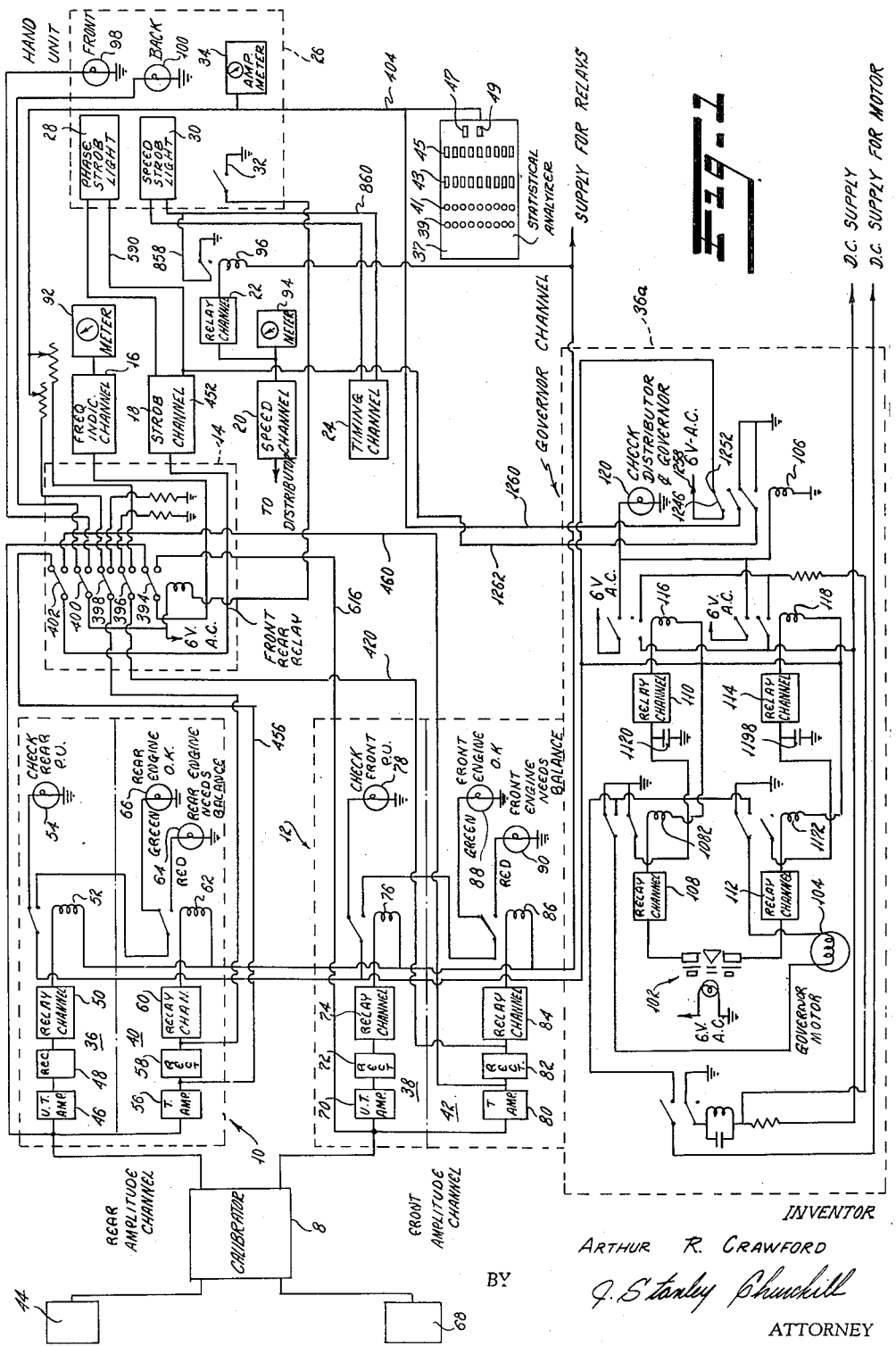
INVENTOR
Arthur R. Crawford
BY J. Stanley Churchill
ATTORNEY

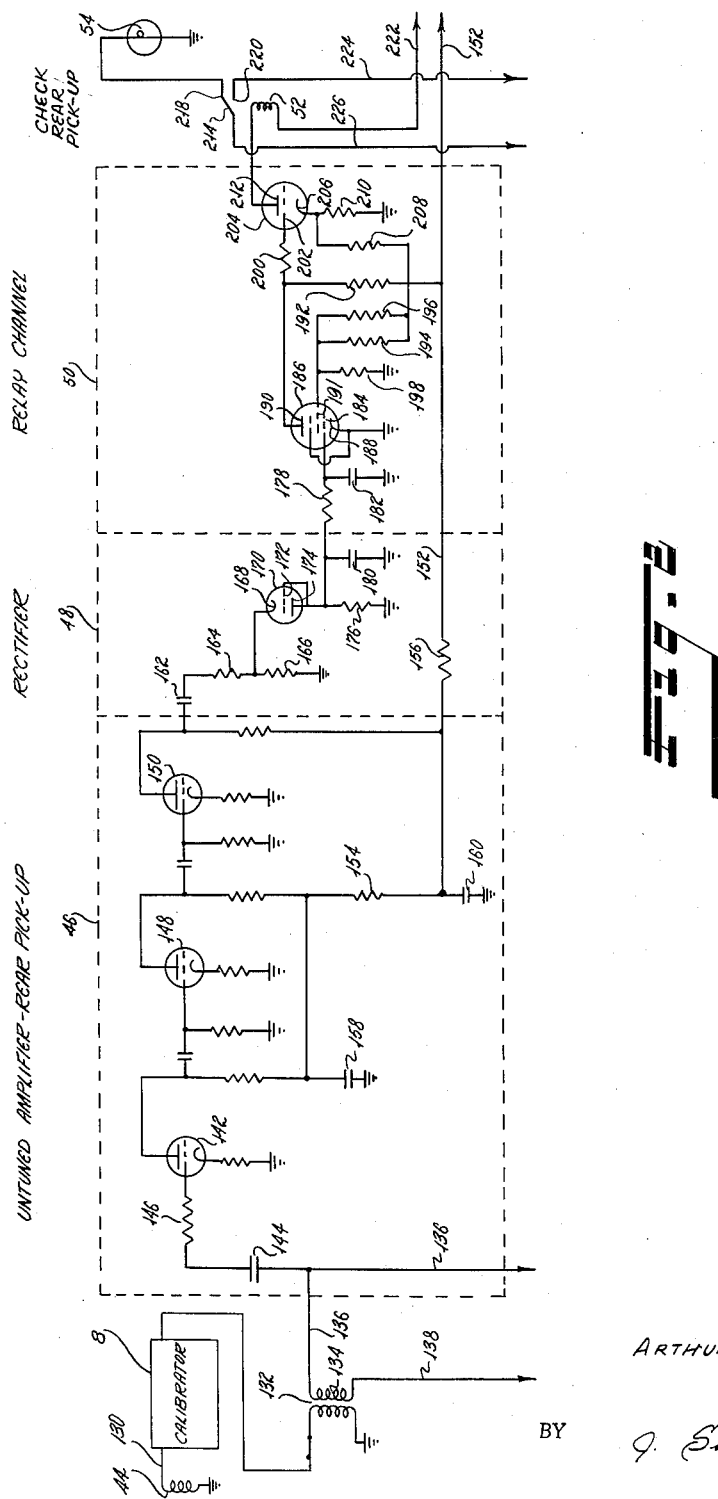

March 6, 1962
A. R. CRAWFORD
3,023,613
ENGINE ANALYZER AND BALANCER
Filed July 13, 1955
13 Sheets-Sheet 3
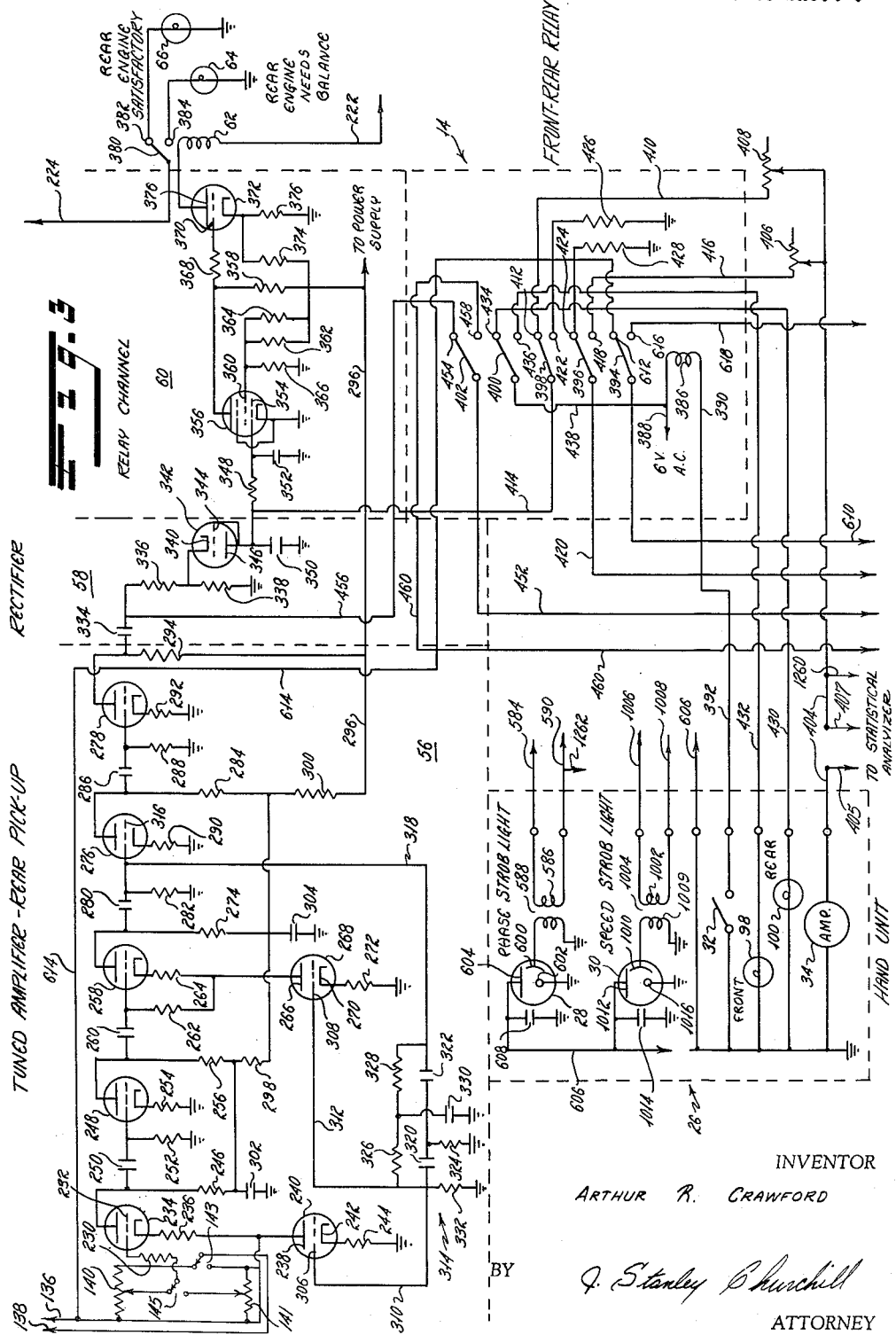
INVENTOR
ARTHUR R. CRAWFORD
BY
J. Stanley Churchill
ATTORNEY

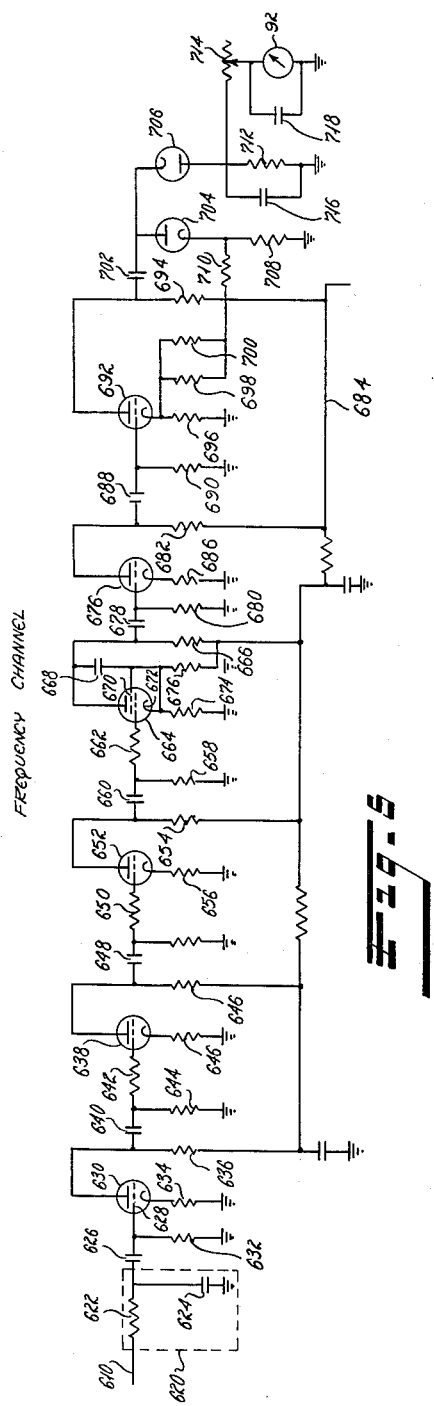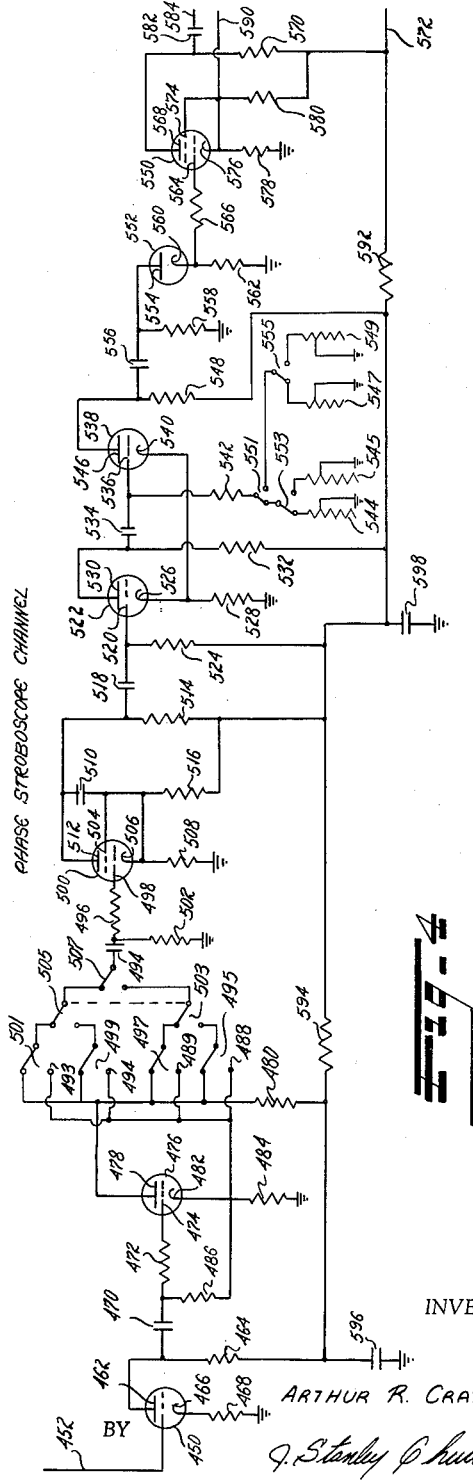

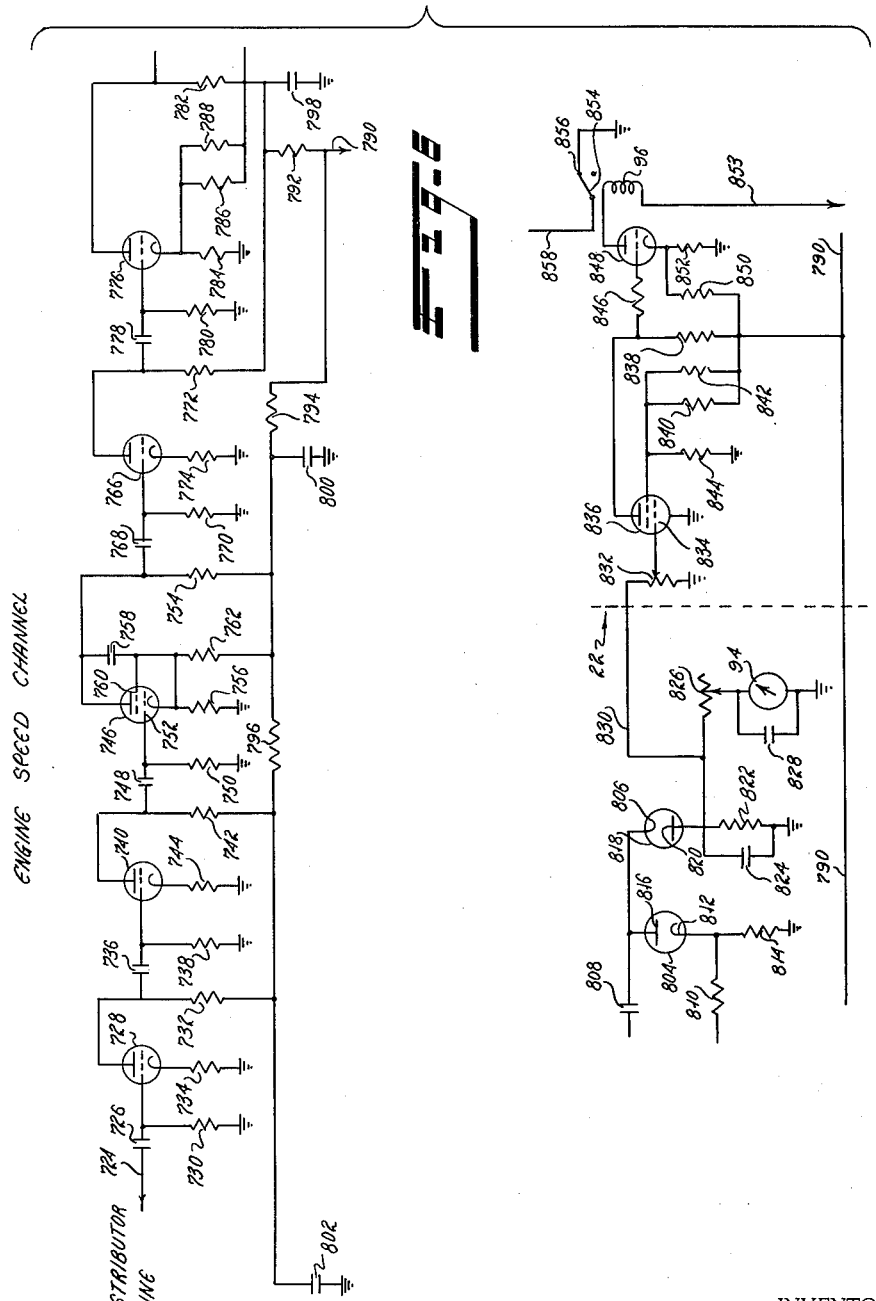

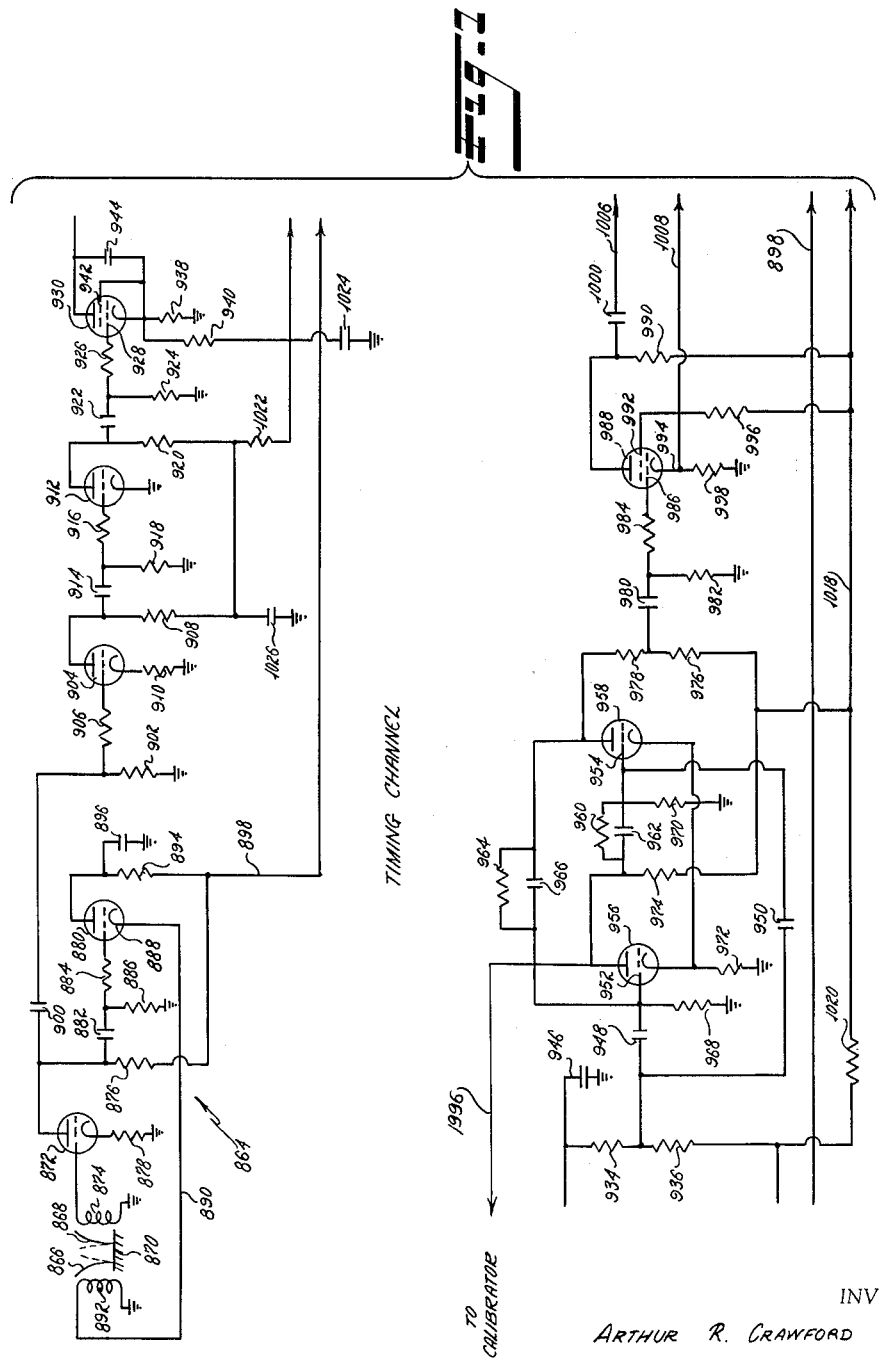

March 6, 1962  A. R. CRAWFORD  3,023,613
ENGINE ANALYZER AND BALANCER
Filed July 13, 1955  13 Sheets-Sheet 7
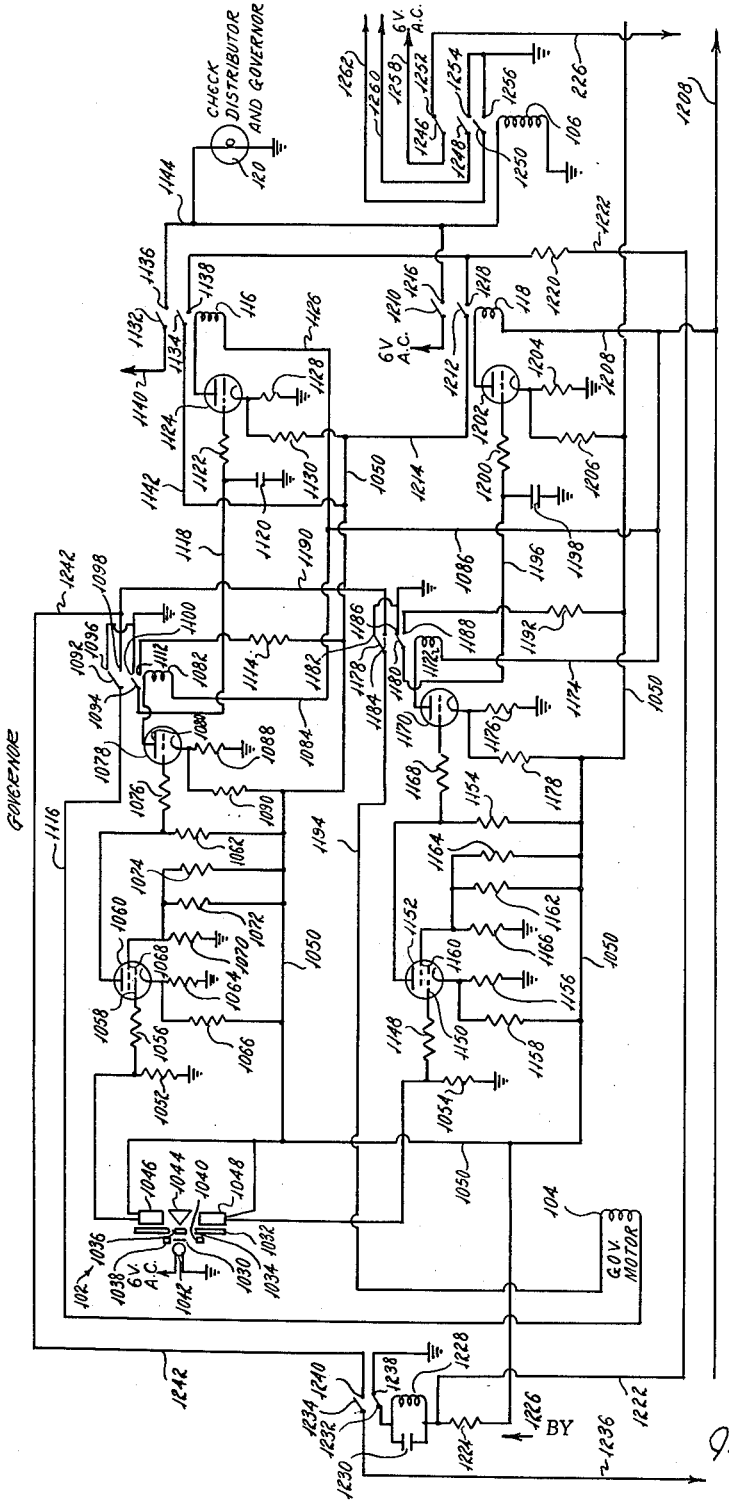
INVENTOR
ARTHUR R. CRAWFORD
BY
J. Stanley Churchill
ATTORNEY

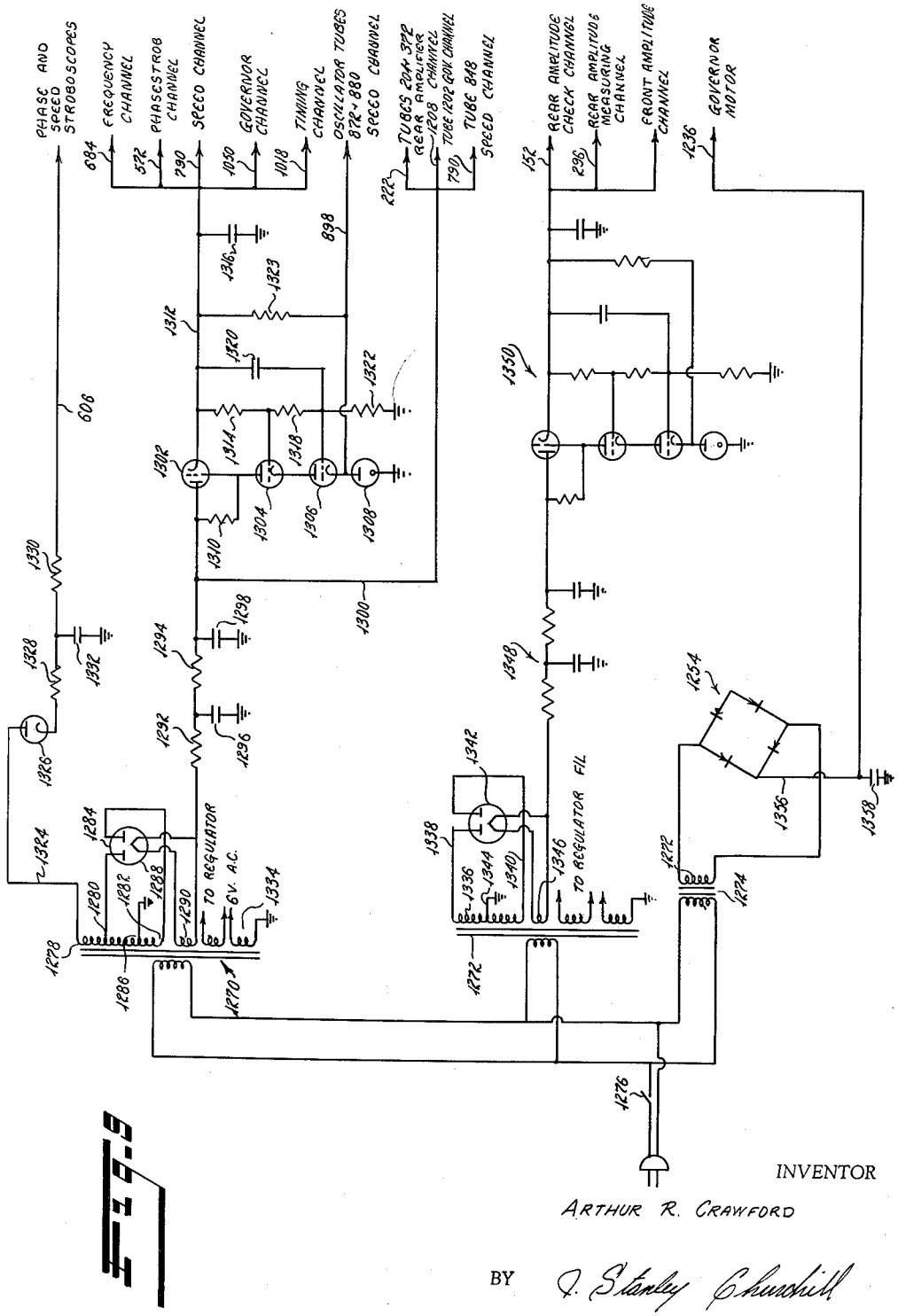

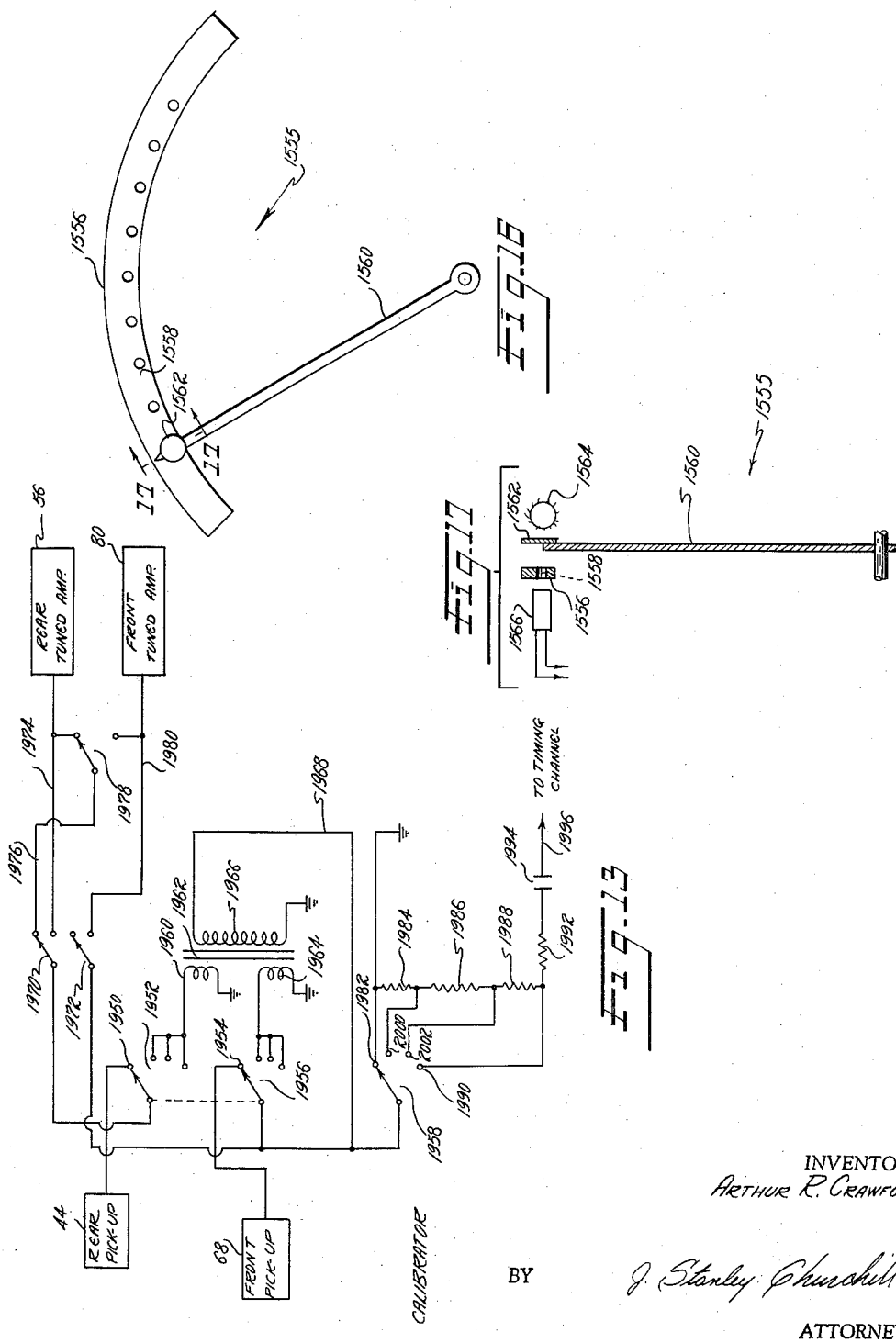

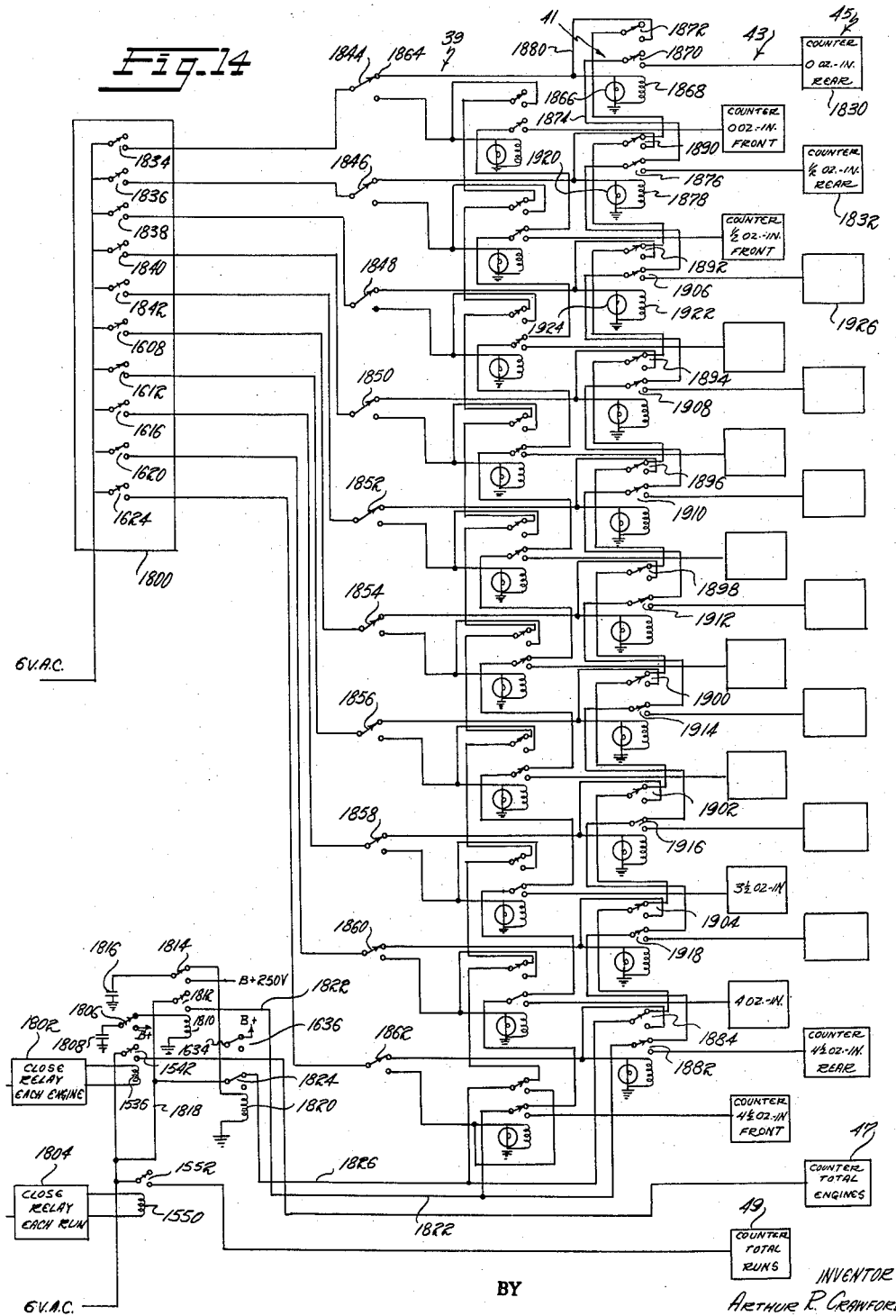

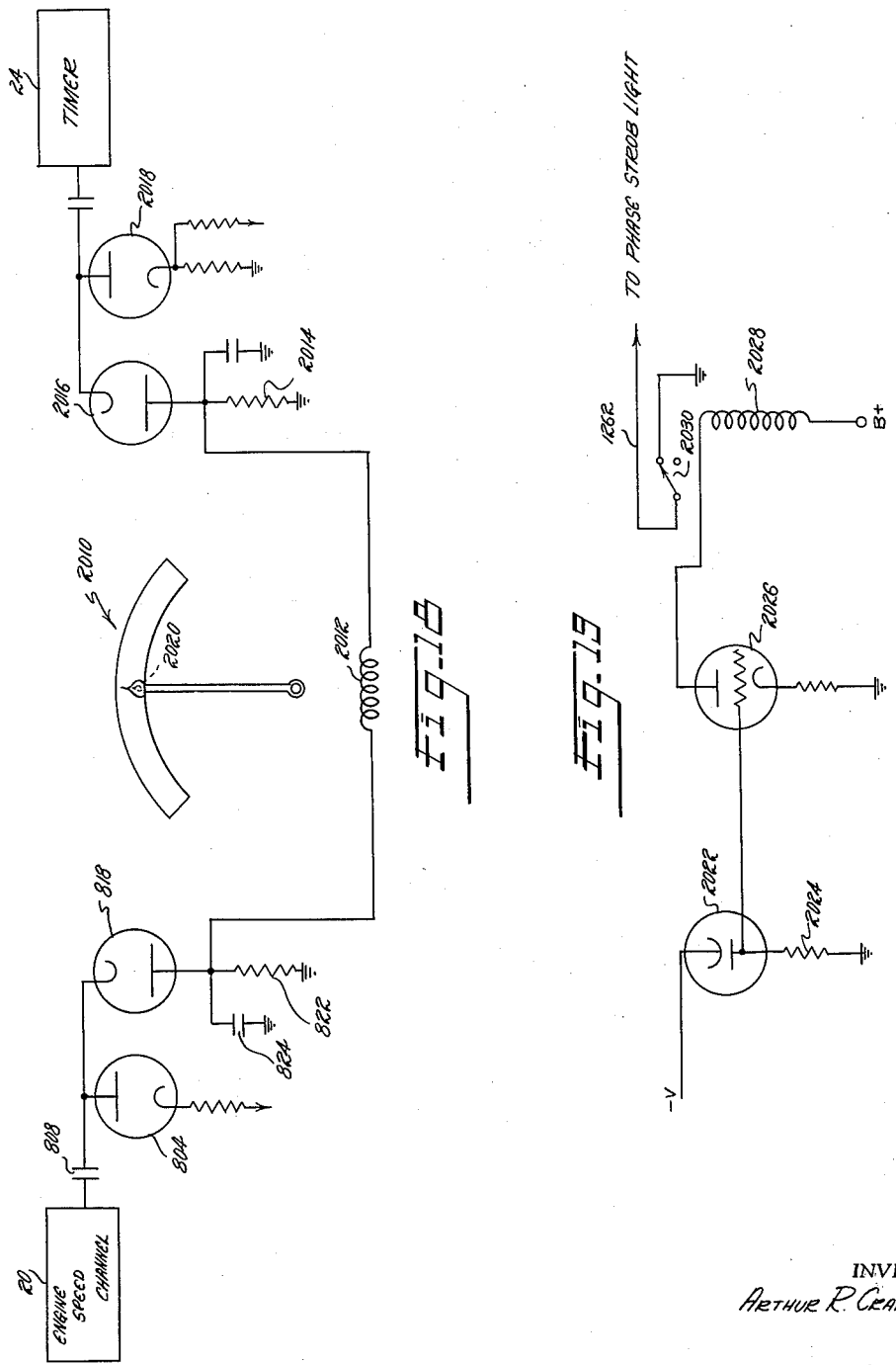

United States Patent Office 3,023,613
Patented Mar. 6, 1962

3,023,613
ENGINE ANALYZER AND BALANCER
Arthur R. Crawford, Columbus, Ohio, assignor to International Research & Development Corporation, Columbus, Ohio, a corporation of Ohio
Filed July 13, 1955, Ser. No. 521,744
14 Claims. (Cl. 73—116)

This invention relates to an engine analyzer and more particularly relates to an engine analyzer and a method for the production balancing of mass produced engines.

In the current mass production of automobiles, it is found economically feasible to production balance the engines of only the higher priced cars and this balancing is carried out through the use of special test stands and balancing equipment. Thus according to conventional procedure on the higher priced engines, the engines coming along the production line are removed from the conveyor, mounted on the balancing machine, each engine is balanced by the same procedure, and is then returned to the conveyor. The balancing machines used are expensive, large and bulky, the test stands are utilized solely for balancing and occupy an appreciable floor space, considerable manpower is utilized in transferring the engines from the conveyor to the test stand and subsequently back to the conveyor, the balancing procedure is relatively time consuming and, as a result, the balancing operation is so costly that it cannot be economically applied to the so-called lower priced cars.

In ordinary high production assembly line manufacture of automobile engines the engines move down the assembly line conveyor and are diverted from their straight path sideways on run-off conveyors which place the engines over "hot test" stands. While still suspended from the conveyor the engines are fastened to these stands, are supplied with water, oil and gasoline and are "run-in" for a certain period of time.

According to the present invention an apparatus and a method have been discovered which permit production balancing of engines during the run-in period without removing the engine from the conveyor and without utilizing any test stand or floor space other than the usual hot test stand. Balancing is carried on for the most part within the normal hot test period in a space of time which is a mere fraction of the time previously employed.

Contrary to previous beliefs I have found that in analyzing and measuring the unbalance in mass produced automobile engines which is caused by the crank shaft, fly wheels and pulleys attached thereto, the lag factor is substantially constant for a given model mass produced engine coming from a given assembly line. That is to say, if a stroboscopic light is fired by a pick-up placed at a given point on the engine, the position of the heavy spot on the rotating element at the moment the light fires is removed from the point of pick-up application by a constant angle for engines of a given model coming off a given assembly line. Based upon this important discovery I have developed an engine analyzer and balancer and a method by means of which, after preliminary balancing operations on the first engine of a type to be balanced, it is possible to balance subsequent similar engines in an extremely small number of steps in a time which heretofore would have been thought ridiculously low.

The apparatus used in such balancing is more accurate and considerably lower in initial cost than the production balancing equipment utilized heretofore, and makes possible balancing on the hot test stands with a tremendous saving in valuable floor space which had been previously assigned to production balancing machines. In most instances the installation of the system of the invention requires no changes in the existing method of conveying and handling the engines and in all cases the balancing time is considerably less than that involved when using conventional production balancing machines.

Whereas all current production balancing of mass produced engines involves a complete balancing of each and every engine I have found that this is unnecessary and have, as another feature of the invention, provided an engine balance classifier which quickly determines which engines do not require balance. This engine classification is accomplished by means of a portable instrument which requires no power supply but which enables an operator to manually bring an engine up to the desired speed and then to determine whether or not the engine is in need of balance.

The engine analyzing and balancing unit itself utilizes a plurality of pick-ups or transducers, preferably one for the front and one for the rear of the engine, and these actuate novel circuitry for simultaneously informing the operator whether the pick-ups are properly applied to the engine, whether the pick-ups are operating properly, and which portions of the engine are in need of balance. The unit also includes a governor channel which accurately controls the engine speed and which contains a means for preventing any of the foregoing indications from being obtained when the engine is not running at the desired speed. This unit contains within itself a further indicating means to point out to the operator that the engine is not at the desired speed and that there is a possible fault in the governor when such is the case. A timing channel is provided for actuating a speed control stroboscope to enable the operator to determine instantly when the engine is running at the proper speed and a speed channel is provided to give an accurate quantitative indication of the engine speed and to de-energize the speed stroboscope when the engine is not running or when it is running at a speed materially below that desired. The analyzer and balancing unit contains a second stroboscopic lamp which is fired through a stroboscope channel in synchronism with the vibration of the crank shaft and its appurtenances, and this stroboscopic light is utilized for determining the phase or position of the unbalance. Provision is made for automatic de-energization of the phase stroboscope when the engine is not running at the desired speed.

An amplitude meter is provided for indicating the amplitude of the vibration and this meter may be calibrated in such units as to directly indicate to the operator the amount of weight which must be added or removed from the crank shaft or apurtenances in order to bring the engine into proper balance. The phase stroboscope, speed stroboscope and amplitude meter are assembled in a lightweight portable hand unit which contains a control switch and indicator lamps to inform the operator at all times which portion of the engine is providing the actuating signals for the phase stroboscope and amplitude meter.

The balancing unit contains a frequency indicating meter which is actuated by the particular pick-up selected by the operator but which responds to the vibration of maximum amplitude rather than to the vibration at the crank shaft frequency. While the objectionable vibration in most engines is at crank shaft frequency, there are occasions where other engine elements are at fault and this meter furnishes the operator with a simple means to so determine.

In addition to the foregoing the balancing unit contains a statistical analyzer which keeps a record of the number of engines to which the instrument is connected, the number of engines which are run after being connected, separate totals of the number of engines out of balance specified amounts on the front end, and separate totals of the number of engines out of balance specified amounts on the rear end. In addition the statistical analyzer contains indicating means to automatically indicate how much weight must be added at the front and the rear in order to place the engine in an acceptable condition of balance. By means of the records maintained by the statistical analyzer it is possible to check on the efficiency of the hot test stand operators and to detect trends in unbalance which will permit eliminating the unbalance at its source rather than as a corrective measure.

The resulting instrument is relatively fool proof in character and permits balancing of engines on the hot test stand in a time and with an expenditure of effort which is only a fraction of that heretofore necessary.

With this equipment it is feasible to provide one engine analyzer and balancer unit having its associated hand unit attached thereto by a relatively long cable so as to permit the one balancing unit to be utilized to balance engines on a large number of hot test stands. In practically all instances the operator can balance the engine from reference to the indicators in the hand unit and from a view of the balancing unit from a considerable distance.

According to the method of the invention the phase stroboscope is utilized to determine the position of unbalance and the amplitude meter or the statistical analyzer is used to determine the amount of weight which must be added to correct the unbalance on each end of the crank shaft. The analyzer and balancer of the invention is provided with a phase shifter for each end of the engine which is then utilized to rotate the locus of weight addition to an easily accessible position and the first engine is balanced. During this balance procedure the relationship of the reading of the amplitude meter to the amount of weight used to bring about a satisfactory balance may be noted and the amplitude meter and statistical analyzer calibrated in untis of weight.

In balancing subsequent engines it has been found that balance may be achieved by noting a reference mark on the rotating body, noting the position of this mark as the rotor rotates under the light of the phase stroboscope, stopping the engine, manually rotating the rotor to place the reference mark in the observed position, and then adding the weight indicated by the amplitude meter or statistical analyzer at the same point as was determined in balancing the first engine. Balance of engines subsequent to the first is thus brought about in a minimum of steps and time during the normal engine run-in period.

It is accordingly a primary object of the present invention to provide a means and method for production balancing mass produced engines.

It is another object of the invention to provide a means and method of balancing mass produced engines in an extremely short period of time with a minimum amount of equipment.

It is another object of the invention to provide a means and method of balancing mass produced engines in such a manner as to effect a considerable savings in initial investment, floor space, and labor costs.

It is another object of the invention to provide a means and method of production balancing mass produced engines in which the balancing of the first engine provides information and instrument settings which are utilized to balance subsequent engines of the same type in materially shorter periods of time.

It is another object of the invention to provide a means and method for production balancing mass produced engines on the hot test stand during the conventional run-in period.

It is another object of the invention to provide an engine classifier unit and a pre-balancing check step to predetermine the necessity for balancing the engines.

It is another object of the invention to provide a means and method for production balancing of mass produced engines wherein no changes in the existent conveying and handling methods are required.

It is another object of the invention to provide an apparatus for production balancing mass produced engines which simultaneously indicates to the operator which portions of the engine are in need of balancing.

It is another object of the invention to provide an apparatus for production balancing mass produced engines wherein no balance or unbalance indications are possible when the pick-up units are defective or are defectively placed or where the engine is not running at the proper speed.

It is another object of the invention to provide an apparatus for production balancing mass produced engines which utilizes a speed stroboscope to accurately indicate when the engine is at the desired speed and which uses an independent phase stroboscope for the balancing step.

It is another object of the invention to provide an apparatus for production balancing mass produced engines wherein a stroboscope is utilized to permit placement of the rotating element so that balance weight may be added or removed at a predetermined spot on the rotating element.

It is another object of the invention to provide an apparatus for production balancing mass produced automobile engines containing an accurate speed indicating meter and containing a frequency meter which is responsive to the vibration of maximum amplitude.

It is another object of the invention to provide an apparatus for production balancing mass produced engines containing an amplitude meter which is calibrated to be readable in units of weight to be applied at predetermined positions on the rotor to be balanced.

It is another object of the invention to provide a transducer energized stroboscope firing unit having provision for varying the phase of firing of the stroboscope.

It is another object of the invention to provide a novel electronic governor for controlling the speed of the engine.

It is another object of the invention to provide a novel low frequency tuned amplifier.

It is another object of the invention to provide a novel engine classifier for indicating engine speed and vibration amplitude without the use of a power supply.

It is another object of the invention to provide a novel frequency indicating device which indicates the frequency of the maximum component of a complex vibration.

It is another object of the invention to provide a statistical analyzer for giving direct indications of the amount of weight needed at the front or rear of the engine to balance that end of the engine.

It is another object of the invention to provide a statistical analyzer which keeps a record of the number of engines to which the instrument is connected, the number of engines which are run after being connected, separate totals of the number of engines out of balance specified amounts on the front end, and separate totals of the number of engines out of balance specified amounts on the rear end.

It is still a further object of the invention to provide all of the foregoing features in a compact, rugged, economical unit capable of being used by non-skilled labor.

It is another object of the invention to provide a vibration actuated phase stroboscope which fires only when the engine is accurately running at a predetermined speed.

It is another object of the invention to provide an engine analyzer which may be initially calibrated to balance a plurality of types of engines wherein engines of these types may be subsequently balanced by an abbreviated balancing procedure without the necessity of repeating the initial balancing steps.

Further objects and advantages of the invention will become apparent upon reference to the following specification and claims and appended drawings wherein:

FIGURE 1 is a block diagram of the analyzer and balancer unit;

FIGURE 2 is a circuit diagram of the amplitude check channel of the rear amplitude channel;

FIGURE 3 is a circuit diagram of the amplitude measuring channel of the rear amplitude channel showing the front-rear relay and hand unit;

FIGURE 4 is a circuit diagram of the phase stroboscope channel;

FIGURE 5 is a circuit diagram of the frequency channel;

FIGURE 6 is a circuit diagram of the engine speed channel;

FIGURE 7 is a circuit diagram of the timing circuit;

FIGURE 8 is a circuit diagram of the governor unit;

FIGURE 9 is a circuit diagram of the various power supplies;

FIGURE 13 is a circuit diagram of the calibrating unit;

FIGURE 14 is a circuit diagram of the statistical analyzer;

FIGURE 15 is a circuit diagram of the actuating circuits for the control relays of the statistical analyzer;

FIGURE 16 is a front elevational view of the meter movement which controls the actuating circuits for the control relays of the statistical analyzer;

FIGURE 17 is a sectional view of the meter movement shown in FIGURE 16 taken along the line 17—17;

FIGURE 19 is a circuit diagram of photocell actuated by the meter movement shown in the embodiment of FIGURE 18.

Figure 10:
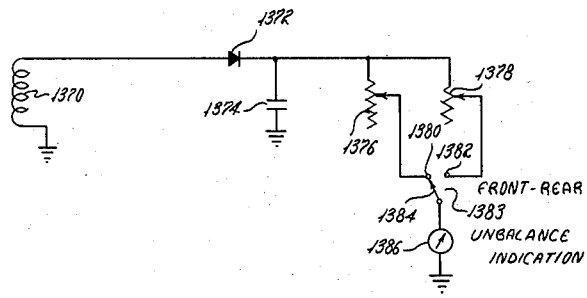
FIGURE 10 is a circuit diagram of the unbalance indicator in the engine classifier.

Before describing in detail the electrical arrangement of the present electronic engine analyzer and balancer, a brief and general description will be given.

Referring to FIGURE 1 there is shown a block diagram of the engine analyzer embodying the calibrator 8, the rear amplitude channel 10, front amplitude channel 12, front-rear relay 14, frequency indicating channel 16, phase stroboscope channel 18, speed channel 20, an associated relay channel 22, timing channel 24, governor channel 36a, statistical analyzer 37, and hand unit 26 including the phase stroboscope 28, the speed stroboscope 30, the front-rear switch 32 and the amplitude meter 34.

Each amplitude channel 10 and 12 is comprised of an amplitude check channel 36 and 38, shown above the center lines within the blocks 10 and 12, and an amplitude indicating channel 40 and 42, shown below the center line in the blocks 10 and 12.

Referring now to rear amplitude channel 10 it will be seen that there is provided a rear pick-up or transducer 44 which is connected through the calibrator 8 to provide an input for both the amplitude check channel 36 and the amplitude measuring channel 40. The pick-up output fed to the amplitude check channel 36 is delivered to an untuned amplifier 46, to a rectifier unit 48 and thence to a relay actuating channel 50 which operates a relay 52 when the rear pick-up 44 is delivering a certain preset minimum signal. When the relay 52 is energized it de-energizes a warning light 54 whose illumination indicates to the operator that the rear pick-up 44 is not functioning properly, as is the case where it is inadvertently not applied to the engine under test.

The amplitude measuring channel 40 is provided with a tuned amplifier 56, a rectifier unit 58 and an associated relay channel 60 which operates a relay 62 to energize lamp 64 when the signal from the rear pick-up 44 exceeds a certain preset maximum, indicating that the rear end of the engine needs balancing. When the signal from the rear pick-up 44 is below this maximum, the lamp 64 remains extinguished and a lamp 66 is illuminated to indicate that the rear end of the engine is satisfactory and needs no balancing.

The front amplitude channel 12 is similar to the rear amplitude channel 10 and consists of an amplitude check channel 38 and an amplitude measuring channel 42 which operate in the same manner as the corresponding channels in the rear amplitude channel unit 10. Thus the amplitude check channel 38 receives an input from front pick-up or transducer 68 and this is fed serially through an untuned amplifier 70, rectifier unit 72 and associated relay channel 74 which actuates relay 76 to operate the front pick-up check bulb 78. The front amplitude measuring channel 42 also receives an input from the front pick-up 68 which is fed serially through a tuned amplifier 80, rectifier unit 82 and associated relay channel 84 which actuates relay 86 to actuate lamps 88 and 90.

The frequency indicating channel 16 receives an input through the front-rear relay 14 from either the rear pick-up 44 or front pick-up 68, depending on the position of the front-rear relay as determined by the position of the front-rear switch 32. The output of the frequency indicating channel actuates a meter 92 which reads the frequency of the component of the vibration having the maximum amplitude.

The phase stroboscope channel 18 receives an input through the front-rear relay 14 over lines 456 and 460 which are connected to the outputs of the tuned amplifiers 56 and 80 in the amplitude measuring channels 40 and 42 of the rear and front amplitude channels 10 and 12 respectively. The output of the phase stroboscope channel 18 is fed to the phase indicating stroboscope 28 in the hand unit 26.

The timing channel 24 provides an independently generated signal for firing the speed stroboscope 30 in the hand unit 26 to indicate when the engine is in exact synchronism with the desired speed signal generated in the timing channel 24.

The speed channel 20 receives an input from the distributor of the engine under analysis and provides a signal for actuating a meter 94 which indicates actual engine speed. The output of the speed channel 20 also controls a relay channel 22 which operates a relay 96 for turning off the speed stroboscope 30 when the engine is not running or is low in speed.

The hand unit 26 is a compact light weight mobile controller and balance tool in which the front-rear switch 32 is mounted to determine, among other things, which pick-up shall actuate the phase stroboscope 28 and the amplitude meter 34. The front-rear switch 32 controls the position of the front-rear relay 14 which performs the actual switching and also causes the energization of lamps 98 or 100 in the hand unit to indicate to the operator which pick-up is actuating the various units in the analyzer.

The governor channel 36a, to be described in detail hereinafter, consists generally of a controller assembly 102 which controls the direction and average speed of rotation of a governor motor 104 which actuates the throttle on the engine under analysis. The governor channel 36 also contains a relay 106 actuated by the control assembly 102 and a series of relay channels 108, 110, 112 and 114 to de-energize the lamps 54, 64, and 66 in the rear amplitude channel 10, lamps 78, 88 and 90 in the front amplitude channel 12, and to de-energize the phase and speed stroboscopes 28 and 30 and amplitude meter 34 when the speed of the engine is excessively removed from the desired speed. The relay 106 is controlled by a pair of relays 116 and 118 which also energize a lamp 120 when the engine is excessively off-speed or the distributor or governor are not operating properly.

The statistical analyzer 37 provides series of indicating lights 39 and 41 for indicating the weight to be added to balance the front and rear of the engine under test, counters 43 and 45 for keeping cumulative totals of the number of times the front and rear of the engine are out of balance in the increments of the weights indicated by the lights 39 and 41, counter 47 for indicating the number of engines to which the unit is connected, and counter 49 for indicating the number of engines run after being connected.

In order to obtain a full and complete understanding of the system and its apparatus components it appears desirable to separate the various channels in the following description with the system being described with respect to the operation thereof.

*Amplitude Channels*

Referring to FIGURES 2 and 3, there is shown the rear amplitude channel 10, with the amplitude check channel 36 being shown in FIGURE 2, and the amplitude measuring channel 40, front-rear relay 14 and hand unit 26 being shown in FIGURE 3. Referring more particularly to FIGURE 2, the rear pick-up or transducer 44 may be of any suitable type, such as for instance the seismic mounted induction type, a preferred embodiment of which is shown in application No. 312,021 filed September 29, 1952, now Patent No. 2,754,435, and has one terminal 130 connected to the calibrator 8 which has its pick-up 44 output connected to a terminal of the primary of an input transformer 132. The other terminals of the pick-up and the transformer are grounded. The secondary 134 of the input transformer 132 is selectively connected by leads 136 and 138 to a pair of potentiometers 140 and 141 shown in FIGURE 3. The upper lead 136 provides the input to the untuned amplifier 46 and is coupled to the grid of the first amplifier tube 142 through a condenser 144 and resistor 146. The untuned amplifier 46 consists of a series of amplifier tubes 142, 148 and 150 which are resistance coupled and which receive a supply of plate voltage from the supply line 152 through a series of decoupling resistors and condensers 154, 156, 158 and 160.

The output of the untuned amplifier 46 is coupled to the rectifier unit 48 through a condenser 162 which is connected to a pair of voltage divider resistors 164 and 166. The mid-point of the resistors 164 and 166 is connected to the cathode 168 of a diode connected triode 170 having its grid 172 connected to its plate 174 which is connected to a grounded load resistor 176.

The signal across the load resistor 176 is connected through a resistance capacitance filter comprising resistor 178 and condensers 180 and 182 to the grid 184 of a sharp cut-off pentode 186 having its cathode 188 grounded and its plate 190 connected through a load resistor 192 to the positive supply line 152. The screen grid 191 of pentode 186 is connected through voltage dropping resistors 194 and 196 to the positive supply line 152 and is also connected to a grounded resistor 198.

The voltage across the load resistor 192 is directly coupled through a resistor 200 to the grid 202 of a relay control triode 204 which has its cathode 206 connected through a resistor 208 to the positive supply line 152 and through a resistor 210 to ground. The plate 212 of this tube is connected to relay 52 having a movable arm 214 and stationary contacts 218 and 220. The other side of the relay 52 is connected to the relay voltage supply line 222. The upper contact 218 of the relay 52 is connected to one terminal of the lamp 54 and the other terminal thereof is connected to ground. The lamp 54 is provided with a suitable indicia to indicate that the rear pick-up or transducer is not functioning such as "check rear pick-up." The lower contact 220 of the relay 52 is connected through a line 224 to the movable arm of the relay 62 for a purpose presently to be described. The movable arm 214 of the relay 52 is connected by means of a conductor 226 to the governor channel 36a and thence to a source of voltage for the lamp 54 as shall presently be described.

The operation of the amplitude check channel 36 of rear amplitude channel 10 is as follows. When the rear pick-up 44 is producing no signal, such as when the operator has forgotten to place it in position on the engine, there is no signal passing through the amplifier channel 46 and consequently no voltage developed across the load resistor 176 in the rectifier channel. Under these circumstances the sharp cut-off pentode 186 is conducting heavily and this keeps the relay triode 204 cut off since its cathode 206 is positive. Under these circumstances the relay 52 is not energized and the movable arm 214 contacts upper contact 218 to light the lamp 54 to indicate to the operator that the rear pick-up is producing an insufficient signal and that something is wrong. The indicia illuminated by this lamp directs the operator to "check rear pick-up" and consequently if the pick-up is not in place upon the engine the difficulty is soon remedied. If the pick-up is for some reason defective, this also would be brought to the operators attention.

When the pick-up 44 is in place upon the engine and is producing a vibration signal, this is fed through the amplifier channel 46 to the rectifier channel 48 causing a rectified negative voltage to appear on the load resistor 176. The resistor capacitor net work 178, 180, 182 smooths this pulsating voltage and tends to maintain the grid 184 of the pentode 186 at a constant voltage. When the signal from the pick-up passes a certain pre-set minimum, as determined by the values of the components in the circuit, the negative voltage on load resistor 176 becomes sufficient to cut off the pentode 186 thereby causing relay triode 204 to conduct, to close contacts 214 and 220 extinguishing the lamp 54 and placing the amplitude measuring channel 40 in a condition to indicate whether or not the rear end of the engine needs balancing.

Turning now to FIGURE 3, there is shown the rear amplitude measuring channel 40, the hand unit 26, and the front-rear relay 14 which are grouped together merely for convenience of illustration. In order to achieve satisfactory high speed balancing it has been found necessary to eliminate all vibration signals at a frequency different from that of the crank shaft and in order to accomplish this a sharply tuned amplifier must be used. The amplitude measuring channel consists of the tuned amplifier 56, the rectifier unit 58 and the relay channel 60.

The potentiometers 140 and 141 are connected across the secondary 134 of the rear pick-up transformer 132 by the leads 136 and 138 through selector switch 143, and the variable taps are connected through switch 145 and resistor 230 to the grid 232 of an amplifier tube 234. The switches 143 and 145 which are preferably ganged together form an engine selector switch presently to be described in further detail. The left ends of potentiometers 140 and 141 are connected to a resistor 236 in the cathode circuit of the tube 234. This resistor 236 is also connected to the plate 238 of a triode 240 which has its cathode 242 connected through a resistor 244 to ground. The tube 240 in the cathode circuit of the first amplifier 234 serves as a source of introduction of degenerative feed back as shall be explained more fully hereinafter.

The plate of tube 234 receives a supply voltage through the load resistor 246 and is coupled to the grid of the following amplifier tube 248 through a coupling condenser 250 and grid resistor 252. The amplifier 248 is provided with a cathode bias resistor 254 and its plate receives supply potential through a load resistor 256 which is coupled to the following amplifier tube 258 through a coupling condenser 260 and grid resistor 262. The grid resistor 262 is connected to a cathode bias resistor 264 which is in turn connected to the plate 266 of a triode 268 having its cathode 270 returned to ground through a resistor 272. The triode 268 serves a similar purpose as the triode 240 in introducing a degenerative feed back signal into the amplifier channel in a manner which has been found particularly advantageous. The plate of the amplifier tube 258 receives its supply voltage through a load resistor 274 and provides an input signal to a further pair of resistance coupled amplifiers 276 and 278.

The output of tube 258 is coupled to the tube 276 by a coupling condenser 280 and grid resistor 282 while the output of tube 276, developed across load resistor 284, is coupled to the grid of tube 278 through a coupling condenser 286 and grid resistor 288. The cathodes of tubes 276 and 278 are returned to ground through cathode bias resistors 290 and 292 and the plate of tube 278 is connected to a source of positive supply through a load resistor 294. All of the various plate load resistors 246, 256, 274, 284 and 294 are connected to a positive supply lead 296 through decoupling resistors 298 and 300 and decoupling capacitors 302 and 304.

The grids 306 and 308 of the tubes 240 and 268 are connected by leads 310 and 312 to a parallel T network 314 which has its input end connected to the grid 316 of the amplifier 276 by means of a connection 318. The parallel T network consists of a first T comprising serially connected condenser 320 and 322 and grounded resistor 324. The second T comprises serially connected resistors 326 and 328 and grounded condenser 330. The resistor 326 and condenser 320 are connected to a lead 310 and to a grounded grid resistor 332.

The parallel T network 314 is a null or notch network having infinite attenuation at the null or notch frequency and having an extremely sharp null or notch, as is fully described in the text "Electronics Engineering Manual," volume VII, McGraw-Hill, pages 242–245. The amplifiers 234, 248, 258, 276 and 278 comprise an amplifier with a flat gain-frequency characteristic and the feed back signal returned through the parallel T network 314 to the tubes 240 and 268 renders the amplifier highly degenerative at all frequencies except the null or notch frequency. At this frequency no degenerative signal reaches the tubes 240 and 268 and thus for this frequency the amplifier operates at maximum gain.

The output of the tuned amplifier channel 56 is coupled to the rectifier channel 58 through a coupling condenser 334 which is connected to a pair of voltage divider resistors 336 and 338. The mid-point of the resistors 336 and 338 is connected to the cathode 340 of a diode connected triode 342 having its grid 344 connected to its plate 346, which is connected to a resistance capacitance filter comprising resistor 348 and grounded condensers 350 and 352. This resistance capacitance filter is then connected to the grid 354 of a sharp cutoff pentode 356 having its cathode grounded and its plate connected through a load resistor 358 to the positive supply lead 296. The screen grid 360 of pentode 356 is connected through voltage dropping resistors 362 and 364 to the positive supply lead 296 and is also connected to a grounded resistor 366.

The voltage across the load resistor 358 is directly coupled through a resistor 368 to the grid 370 of a relay control triode 372 which has its cathode connected through a resistor 374 to the positive supply lead 296 and through a resistor 376 to ground. The plate 378 of this tube is connected to the relay 62 which has a movable arm 380 and stationary contacts 382 and 384. The other side of the relay 62 is connected to the relay voltage supply line 222. The upper contact 382 of the relay 62 is connected to one terminal of the lamp 66 and the other terminal thereof is connected to ground. The lamp 66 is provided with a suitable indicia to indicate that the rear of the engine under test is satisfactory and needs no balancing.

The lower contact 384 of the relay 62 is connected to one terminal of the lamp 64 which has its other terminal grounded. This lamp is provided with a suitable indicia to indicate that the rear end of the engine under test is in need of balance.

The operation of the amplitude measuring channel 40 of rear amplitude channel 10 is as follows. When the rear pick-up 44 is producing a sufficient signal to cause operation of the relay 52 in the amplitude check channel, the operator is apprised of the fact that the rear pick-up is operating satisfactorily and may then direct his attention to the lamps 64 and 66 in the amplitude measuring channel to determine whether or not the rear end of the engine needs balance.

The actuation of the relay 52 closes the lower contact 220, as seen in FIGURE 2, to provide power to the movable arm 380 of relay 62 through connection 224. The amplifier channel 56 delivers to the rectifier channel 58 a substantially sine wave signal at the chosen frequency of vibration. The tuned amplifier channel 56 amplifies that component of the output of the rear pick-up to which the parallel T network 314 is tuned, thereby eliminating background vibration and other irrelevant transitory interferences. A substantially sine wave signal is thus delivered to the rectifier channel 58 which causes, a rectified negative voltage to appear on the grid 354 of the sharp cut-off pentode 356. The resistor capacitor network 350, 348 and 352 smooths the pulsations in this voltage and tends to maintain the grid 354 at a constant voltage. When the voltage on the grid 354 of the pentode 356 is below a preset maximum, which is considered the acceptable level of vibration, the pentode 356 is conducting heavily and this keeps the relay control triode 372 cut-off since its cathode is maintained positive. Under these circumstances the relay 62 is de-energized and the movable arm 380 contacts upper contact 382 to light the lamp 66 to indicate to the operator that the rear end of the engine is satisfactory and needs no balancing. If the signal developed at the grid 354 of the pentode 356 is in excess of the preset maximum allowable vibration signal, the pentode 356 is cut-off thereby raising the grid 370 of the triode 372 to a positive voltage and causing the relay 62 to be energized to move the movable arm 380 into contact with stationary contact 384. This energizes lamp 64 and indicates to the operator that the rear of the engine under test needs balancing.

The front amplitude channel 12 comprises an amplitude check channel 38 and amplitude measuring channel 42 which are similar in all details to the amplitude check channel and amplitude measuring channel for the rear pick-up. The front amplitude channel thus will not be described in detail and all reference to the elements thereof are made in connection with FIGURE 1 which shows a diagrammatic illustration of the entire analyzer.

Referring again to FIGURE 3, there is shown a hand unit 26 which contains a phase indicating stroboscopic light 28, a speed indicating stroboscopic light 30, a front-rear control switch 32, a pair of indicator lamps 98 and 100 and an amplitude indicating meter 34.

Also shown in FIGURE 3 is the front-rear relay 14 which has an actuating coil 386 having one terminal connected to a source of relay actuating voltage, such as a six volt alternating current source. The other terminal 390 of the winding 386 is connected through a lead 392 to the front-rear switch 32 in the hand unit 26 and this switch is connected to ground. Closure of the front-rear switch 32 in the hand unit thus energizes the winding 386 of the front-rear relay 14. The front-rear relay is provided with a set of movable arms, five of which, 394, 396, 398, 400 and 402, are shown in FIGURE 3, and each movable arm is provided with a pair of stationary contacts.

The amplitude meter 34 in the hand unit 26 has one terminal thereof grounded and has the other terminal connected through a lead 404 to a pair of calibrating potentiometers 406 and 408. The potentiometer 408 is connected through a lead 410 to the upper stationary contact 412 of the movable arm 398 in the front-rear relay 14. The movable arm 398 is in turn connected through a connection 414 to the output of the rectifier unit 58 at the resistor 348. Thus when the front-rear switch 32 and front-rear relay 14 are in the position shown in FIGURE 3 with the movable arm 393 in its uppermost position, the output of the rectifier unit 58 in the amplitude measuring channel 40 of the rear amplitude channel 10 is connected through the calibrating potentiometer 408 and connection 404 to the amplitude meter 34 in the hand unit 26 to indicate quantitatively the amplitude of vibration of the rear end of the engine under test.

The potentiometer 406 is connected through a lead 416 to the lower stationary contact 418 of the movable arm 396 which is in turn connected through a lead 420 to the output of the rectifier unit 82 in the amplitude measuring channel 42 of the front amplitude channel 12 as is seen in FIGURE 1. The lower stationary contact 422 of the movable arm 398 and the upper stationary contact 424 of the movable arm 396 are connected respectively to a pair of grounded resistors 426 and 428 which provide load resistors in the plate circuits of the rectifiers.

When the front-rear relay 14 is in the position shown in FIGURE 3 and the movable arms 398 and 396 are in their uppermost positions, the plate 346 of the rectifier 342 is connected through lead 414, movable arm 398, stationary contact 412, connection 410, calibrating resistor 408, and lead 404 to the amplitude meter 34 which is turn in grounded. The calibrating resistor 408 serves as a load resistor in the plate circuit of the rectifier. At the same time the plate of the rectifier 82 in the front amplitude channel 12 is connected through lead 420, movable arm 396 and stationary contact 424 to the grounded resistor 428 which serves as a load resistor for that rectifier tube. When the front-rear relay 14 is energized and the movable arms assume their lowermost positions this condition is reversed so that the rectifier tube 342 has the resistor 426 in its plate circuit while the rectifier tube in the rectifier unit 82 in the front amplitude channel 12 has the calibrating resistor 406 and amplitude meter 34 in its plate circuit.

The front and rear indicating lamps 98 and 100 in the hand unit 26 have their ungrounded leads connected through connections 430 and 432 to upper and lower stationary contacts 434 and 436 respectively of movable arm 400 and the movable arm 400 is itself connected through a lead 438 to the relay supply lead 388. It will thus be seen that with the front-rear switch 32 in its open position, as shown in FIGURE 3, the relay coil 386 of front-rear relay 14 is de-energized and the movable arms are all in their uppermost positions. In this condition the amplitude meter 34 is connected to the output of the rear amplitude measuring channel to indicate the amplitude of vibration of the rear end of the engine under test which is being caused by its crank shaft. The rear lamp 100 in the hand unit is energized to indicate to the operator that the measurement being obtained on the amplitude meter 34 is coming from the rear pick-up. It will be seen as the detailed description progresses that the front-rear switch 32 and lamps 98 and 100 enable the operator to select the desired pick-up and keep him continuously advised of which pick-up is actuating the various units of the analyzer.

*The Calibrator Channel*

The amplitude indicating meter 34 may provide numerical indications of the weight necessary to be added to a given engine to bring it into balance or, where even further simplicity is desired, the scale of the amplitude meter may be provided with simple alphabetical designations such as "A," "B," "C," etc. In order that these indications be accurate and occupy a sufficiently large portion of the scale of the meter it is necessary to calibrate the analyzing unit and potentiometers 140 and 141 in the input to the tuned amplifiers and potentiometers 406 and 408 in the lead to the amplitude meter are provided for this purpose. Initial calibration is carried out during the balancing of the first engine of a given type and the calibrator channel is provided to permit a return to this calibration if the instrument is used upon different engines in the meantime. The calibration unit also provides a simple check on the operation of the entire circuit between the pick-up and the amplitude meter.

Referring to FIGURE 13 the rear pick-up 44 is connected to the uppermost contact 1950 of a switch 1952 while the front pick-up 68 is connected to the corresponding contact 1954 of a switch 1956. Each of the switches 1952 and 1956 and a further switch 1958 are provided with a total of four stationary contacts and the three lowermost stationary contacts on switches 1952 and 1956 are connected to secondaries 1960 and 1964 of a transformer 1962. Each of these secondaries has its other terminal connected to ground. The primary 1966 of transformer 1962 is connected by a conductor 1968 to the movable arm of switch 1958. The movable arm of switch 1952 is connected to the movable arm of a further switch 1970 and the movable arm of switch 1956 is also connected to the movable arm of a further switch 1972. The switch 1970 has a pair of stationary contacts one of which is connected through conductor 1974 to the input of the rear tuned amplifier 56 and the other stationary contact is connected through a conductor 1976 to a further switch 1978 which may be a portion of the front-rear relay. The lowermost stationary contact of switch 1972 is connected by conductor 1980 to the front tuned amplifier 80 and conductors 1974 and 1980 are further connected to stationary contacts of the switch 1978.

The switches 1970, 1972 and 1978 make it possible for an operator to use a single pick-up should he so desire, placing it first on one end and then on the other end of the engine. Thus where these switches are in the positions shown in FIGURE 13 rear pick-up 44 is in use and may be used to actuate either the rear tuned amplifier 56 or the front tuned amplifier 80 by merely throwing the switch 1978. As shown in FIGURE 13 the rear pick-up 44 is actuating the rear tuned amplifier 56. If the switch 1978 is thrown to its lowermost position the rear pick-up 44 will actuate the front tuned amplifier 80. Where the switches 1970 and 1972 are thrown to their lowermost positions each pick-up 44 and 68 is connected directly to its associated tuned amplifier 56 and 80 and the switch 1978 becomes ineffective.

Turning now to the connections of the calbirator switch 1958, it will be seen that the uppermost stationary contact 1982 is connected to ground and to the uppermost resistor 1984 in a series of resistors 1984, 1986 and 1988 which are connected across stationary contacts 1982 and 1990. The junctions of the resistors 1984, 1986 and 1988 are similarly connected to the remaining stationary contacts of the switch 1958 so that the resistors 1984, 1986 and 1988 act as a voltage divider. A voltage is fed to these resistors through resistor 1992 and coupling condenser 1994 which is connected by means of conductor 1996 to the plate of the multi-vibrator tube 956 in the timing channel. This places a 25 cps. signal on the resistors 1984, 1986 and 1988 and this is fed through switch 1958 to the primary 1966 of transformer 1962.

For any given set of types of automobile engines, such as those different models manufactured on different production lines of a single manufacturer, there is a certain experimentally determined maximum unbalance which occurs and it is desirable to have the amplitude meter 34 read full scale for this unbalance. Since the balancing weights applied to the front and the rear of the rotating elements of the engine are normally applied at different radial distances from the axis of rotation they have different balancing effects due to the different torque produced, and it is necessary to provide different calibrations on the front and rear of the engine if the amplitude meter is to have but a single scale. Potentiometers 140, 141, 406 and 408, shown in FIGURE 3, provide this necessary calibration adjustment.

The first step in calibrating the front and rear amplitude channels comprises moving switches 1952 and 1956 to any of the lower 3 positions, which are called the calibrate positions, and moving switch 1958 to its lowermost position in contact with stationary contact 1990. This feeds a maximum signal from the timing channel 24 through the transformer 1962 into the front and rear amplitude channels 42 and 40. Referring now to FIGURE 3 and assuming that switches 143 and 145 in the input potentiometer circuit are in their uppermost positions to place potentiometer 140 in the circuit, potentiometer 140 is adjusted so that a signal is fed to the amplitude channel 40 which is the maximum that can be handled without introducing distortion. That is to say the potentiometer 140 is adjusted until the amplitude channel is receiving the maximum signal which it can handle as a linear amplifier. With this signal passing through the amplitude channel the potentiometer 408 is adjusted to cause the amplitude meter 34 to give a full scale deflection, thereby assuring that so long as the amplitude meter 34 is not driven off scale the amplifiers in the amplitude channel will be operating as linear amplifiers and the calibration will be correct for all settings of the calibrating potentiometers 140 and 141. This same step is repeated for the front amplitude channel 42 utilizing the calibrating potentiometer 406 in series with the amplitude meter 34. Once the potentiometers 406 and 408 have been set, which is customarily done before the instrument is ever delivered to the test floor, there is no necessity for any further adjustment of these potentiometers.

Having previously determined by experience the maximum unbalance weight or torque which is likely to be encountered in the engines to be balanced the maximum weight thus determined for the rear of the engines is applied to the rear of a balanced engine and the rear pick-up is connected to actuate the amplitude meter 34. With this maximum signal being fed to the amplitude meter 34 the potentiometer 140 is adjusted so that the meter 34 reads full scale. Since the amplifiers are linear due to the prior adjustment of potentiometer 408 it is now possible to mark in the entire scale of the amplitude meter 34. The foregoing weight is then removed from the rear of the engine and the maximum weight likely to be encountered for the front of the engine is applied thereto and the potentiometer corresponding to potentiometer 140 in the front amplitude channel is similarly adjusted to give a full scale reading of the amplitude meter. This provides complete calibration for a given engine.

If now it is desired to balance a different type of engine without losing the calibration established for the first type, the switches 1952 and 1956 in FIGURE 13 are switched to their calibrate positions so that a signal from the timing channel is fed through the amplitude channel including potentiometers 140 and 141 to actuate the amplitude meter 34. The readings of amplitude meter 34 are recorded for both the front and rear positions and it is a simple matter thereafter to return to these settings by merely switching to calibrate and adjusting potentiometers 140 and 141 so that the amplitude meter reads the recorded values. The operator thus makes a permanent record of the reading of the amplitude meter with the timing channel actuating the amplitude channel and can thereafter return to this calibration setting by merely shifting his switches 1952 and 1956 to calibrate and adjusting the potentiometers 140 until these same readings are obtained. In order to insure that the calibrate signal will give a high scale reading on the amplitude meter 34 at the particular setting of the potentiometers, the voltage divider consisting of resistors 1984, 1986, and 1988 is provided so that by switching the calibrate switch 1958 down through its three lowermost positions the operator can get an adequately high reading. That is to say, when the operator desires to make a record of the setting of potentiometers 140 in order to be able to subsequently return to this setting, he first turns the switch 1958 to stationary contact 2000. If the amplitude meter 34 reads a sufficiently large amplitude to allow accurate recording he records this reading and is finished. If, however, the amplitude meter is reading too low for accurate recordation the operator switches to position 2002 and then makes his record. If position 2002 is also unsatisfactorily low the operator may switch to the final position 1990 which will give the necessary high scale reading. Having made the necessary record of the setting of the calibrating potentiometers for the original engine the operator may thereupon proceed to calibrate the unit for another type of engine.

It is a further feature of the invention that the unit is provided with a plurality of calibrating potentiometers, such as 140 and 141 in FIGURE 3, so that as long as the number of different type of engines on which the instrument is being used does not exceed the number of calibrating potentiometers the operator may shift from engine to engine by merely throwing the engine selector switches 143 and 145 to select the desired calibrating potentiometers. Thus with the circuit shown in FIGURE 3 the instrument may be shifted from one engine to another by merely throwing the engine selector switches 143 and 145 and may also be used on additional different types of engines without losing calibration data by using the calibration procedure outlined.

*The Phase Stroboscope Channel*

The first amplifier tube 450 in the phase stroboscope channel 18, shown in FIGURE 4, receives its grid input from a conductor 452 which is connected to the movable arm 402 of the front-rear relay 14. The upper stationary contact 454 of the movable arm 402 is connected through conductor 456 to the coupling condenser 334 at the output of the tuned amplifier 40 in the rear amplitude channel 10 while the lower stationary contact 458 is connected through conductor 460 to the output of the tuned amplifier 80 in the front amplitude channel 12 as may be seen in FIGURES 1, 3 and 4. Input to the phase stroboscope channel is thus received either from the front or rear pick-up depending upon the position of the front-rear switch 32 and front-rear relay 14.

The amplifier tube 450 is connected in a conventional class A circuit wherein its plate 462 receives positive supply voltage through a load resistor 464 while its cathode 466 is returned to ground through a cathode bias resistor 468.

The output from this stage is coupled by means of a condenser 470 and resistor 472 to the grid 474 of a phase-shift stage 476. The plate 478 of the tube 476 is connected through load resistor 480 to a source of positive supply while the cathode 482 is connected through a resistor 484 to ground. A grid resistor 486 is connected between the coupling capacitor 470 and the cathode 482. The cathode is further connected to a series of stationary contacts 488, 489, 491 and 493 on switches 495, 497, 499 and 501. The other stationary contacts on switches 495, 497, 499 and 501 are connected to the plate 478 of tube 476 and the movable arms of such switches are connected to the stationary contacts of further switches 503 and 505. The switches 503 and 505 are in turn connected to front-rear switch 507. By moving the movable arms of switches 495, 497, 499 and 501 a 180° phase shift is introduced into the output signal for a reason presently to be described.

The output of the stage 476 and the movable arm of switch 507 is coupled by means of a condenser 494 and coupling resistor 496 to the grid 498 of a trigger pulse producing tube 500 which may be a gas tube. A grid resistor 502 is provided between the condenser 494 and ground and the shield grid 504 of the tube 500 is connected to the cathode 506 which is in turn connected to a grounded cathode bias resistor 508. A firing condenser 510 is connected between the plate 512 and cathode 506. The plate 512 receives a positive potential through the plate resistor 514 and the shield grid 504 and cathode 506 are also connected to the positive supply potential through a resistor 516.

The positive pulses developed across the load resistor 514 are coupled by means of a condenser 518 to the grid 520 of a triode 522 and the grid 520 is provided with a positive bias by means of the resistor 524 connected to the positive supply lead. The cathode 526 of tube 522 is returned to ground through a cathode bias resistor 528 and the plate 530 receives its positive supply potential through a load resistor 532. The tube 522 constitutes one tube of a monostable multivibrator and is coupled through a coupling condenser 534 to the grid 536 of the other tube 538 which has its cathode 540 connected to the cathode 526 of the tube 522. A grid resistor 542 is connected to grid 536 and to a series of grounded potentiometers 544, 545, 547 and 549 through switches 551, 553 and 555. Only one potentiometer is in the circuit at any given moment and this provides a phase adjustment as shall presently be described. The plate 546 of tube 538 receives its positive potential supply through a load resistor 548 and the signal developed in this resistor is coupled to the firing tube 550 through a diode 552.

The plate 554 of the diode 552 is coupled to the load resistor 548 through a condenser 556 and this condenser is connected to a grounded resistor 558. The cathode 560 of the diode is returned to ground through a resistor 562 and the sharp positive pulses developed across this resistor are connected to the grid 564 of the firing tube 550 through a resistor 566.

The firing tube 550 is connected in a manner similar to the pulse producing tube 500 and has its plate 568 connected through a load resistor 570 to a postive supply line 572. The shield grid 574 is connected to the cathode 576 while the cathode is connected to ground through a resistor 578. The shield grid and cathode are further connected through a resistor 580 to the positive supply line 572. A firing condenser 582 is connected to the plate 568 and to a lead 584 which terminates in the primary winding 586 of the phase stroboscope firing transformer 588 in the hand unit 26. The other terminal of the primary 586 is connected through a conductor 590 to the cathode 576 of the firing tube 550.

The transformer 588 is provided with a secondary having one terminal connected to the control electrode 600 of the phase stroboscope tube 28 and having the other terminal thereof grounded. The cathode 602 of this tube is connected to ground while the plate 604 is connected through a lead 606 to a supply of positive potential. A firing condenser 608 is connected across the plate and cathode.

Positive plate potential is supplied to the various tubes in the phase stroboscope channel from the positive supply lead 572 through a pair of decoupling resistors 592 and 594 and decoupling condensers 596 and 598.

The operation of this circuit is as follows. A sine wave input at crank shaft frequency is supplied to the first amplifier 450 from either the front amplitude or the rear amplitude channel depending upon the position of the front-rear relay 14 which is determined by the setting of the front-rear switch 32. This signal is amplified by the tube 450 and may be subjected to clipping action if desired, and is then fed to the phase shift tube 476. Two outputs are provided from this stage so that by actuation of the movable arms on the output switches 495, 497, 499 and 501 two signals may be selected which differ 180° in phase in order to permit convenient positioning of the reference mark utilized in the balancing operation and also to permit convenient placement of the portion of the crank shaft which is to have weight added or removed. The switch 507 allows selection of front or rear pick-ups while the switches 503 and 505 allow selection of the particular type of engine being balanced. Thus once switches 495, 497, 499 and 501 are set they may remain in position as long as the instrument is operating on these two engines. Additional switches may be provided if fixed settings for additional engines are desired. The signal from switch 507 is fed as a sine wave or as a square wave, where clipping is utilized, to the grid of the pulse producing tube 500.

When this tube 500 is not conducting the condenser 510 charges through resistor 514. When the tube 500 is fired by a positive pulse or signal on its grid 498 the condenser 510 discharges through the tube. When the voltage across the tube drops below the critical value it ceases to conduct and the condenser 510 again commences to charge. The condenser 510 and resistors 514 and 508 are so chosen that the condenser charges rapidly and remains at substantially plate voltage except when discharging. A voltage is thus obtained across the load resistor 514 which comprises a steady positive voltage interrupted by sharp negative pulses caused by the firing of the tube 500 at the frequency of the crank shaft.

This signal is fed to the monostable multivibrator tube 522 to produce a series of positive pulses across the load resistor 548 wherein the position of the positive rise in the wave is controlled by the phase shifting networks 544, 545, 547 and 549 to provide a vernier adjustment of phase to provide a fine positioning of the reference mark used in the balancing operation. The switch 551 is a front-rear switch while the switches 553 and 555 are engine selector switches to allow the instrument to handle two different engines without a necessity of resetting the phase adjustment. It will be noted that the tube 522 is normally in a conducting condition by reason of the connection of its grid 520 to the positive supply line through the resistor 524 and that it is biased to cut-off by the sharp negative going pulses received from the pulse producing tube 500. The tube 538, having its cathode 540 connected to the cathode 526 of the preceding tube 522 starts to conduct when the tube 522 cuts off and remains conducting for a period determined by the phase shift network. The output signal across the resistor 548 is fed to a differentiator circuit 566 and 558 having a time constant which is small compared to the period of the signal. The diode 552 rectifies the differentiated sharp pulses appearing on the resistor 558 and also performs a pulse sharpening action to give exceedingly sharp front edges. A series of sharp positive pulses is thus fed to the grid 564 of the firing tube 550.

The firing condenser 582 in the plate-cathode-circuit of the tube 550 charges through the resistors 570 and 578 during the time that the tube 550, which may be a gas tube, is non-conducting. When the tube 550 is fired by a positive pulse upon its grid 564, the condenser 582 discharges rapidly through the tube to develop a large voltage impulse in the primary 586 of the stroboscope transformer 588. This renders the phase stroboscope 28 conductive and the firing condenser 608 thereupon immediately discharges therethrough to provide the desired sharp flash of light.

*The Frequency Channel*

Referring to FIGURE 5 there is shown a circuit diagram of the frequency channel 16 which receives an input from a conductor 610 which is connected to the movable arm 394 of the front-rear relay 14. The upper stationary contact 612 of the movable arm 394 is connected through a conductor 614, as may be seen in FIGURE 3, to the lead 136 which terminates in the secondary 134 of the rear pick-up transformer 132. The lower stationary contact 616 of the movable arm 394 is connected by a conductor 618 to the output transformer of the front pick-up 68 as may be seen in FIGURES 1 and 3. The front-rear switch 32 in the hand unit 26, which controls the front-rear relay 14, thus controls the particular pick-up which supplies a signal to the frequency channel 16. This signal does not pass through any tuned circuits and thus is a complex signal having components which bear fixed relations to the various components of the vibration which actuates the pick-up.

Since conventional pick-ups utilizing a substantially uniform magnetic field moving relative to a coil produce an output voltage which is proportional to the relative velocity between the field and the coil, the output wave form of the pick-up is not a true replica of the displacement wave form of the mechanically moving element for any practical complex vibration. This is to say, the pick-up voltage produced is proportional to the product of frequency and amplitude.

For reasons which shall appear hereinafter it is desirable to have the frequency channel respond to the maximum component of the complex vibration and to that end the complex electrical signal on the input line 610 is connected to a translating circuit 620 which may comprise a resistor 622 and condenser 624. It is the purpose of this circuit to modify the pick-up signal voltage, which is proportional to vibration frequency and amplitude, to produce a translated output voltage proportional to vibration amplitude substantially independent of vibration frequency, this output voltage having a wave shape which is substantially a replica of the displacement of the device under study when that displacement is plotted against time.

In order to perform this function the impedance values of the resistor 622 and condenser 624 are so proportioned that, over the working range of frequency, the impedance of the condenser is small compared to that of the resistor. Under these conditions the instantaneous voltage across the capacitor is substantially proportional to the time integral of the instantaneous voltages impressed upon the input circuit. That is to say, the impedance of the condenser 624 decreases linearly with a rise in frequency and this compensates for the linear rise in pick-up output voltage with an increase in frequency at a given vibration amplitude, so that the voltage across the condenser 624 represents a true indication of vibration amplitude independent of frequency.

The output from the translator circuit 620 is fed through a coupling condenser 626 to the grid 628 of a first triode amplifier 630 and the grid 628 is connected to ground through a grid resistor 632. The cathode of the triode 630 is connected through an un-bypassed cathode resistor 634 to ground and the plate of the tube 630 receives its positive supply potential through a load resistor 636.

The output from the tube 630 is fed to the grid of a second triode 638 by means of a coupling condenser 640 and grounded grid resistor 644 and the plate of this tube receives a positive supply potential through a load resistor 646.

The output of this stage is fed through a further coupling condenser 648 and decoupling resistor 650 to the grid of another triode amplifier 652. The plate of this tube receives its positive supply potential through a load resistor 654 and has its cathode connected to ground through a cathode resistor 656. The output of the tube 652 passes through a differentiating network consisting of a resistor 658 and condenser 660, which is utilized to sharpen the signal prior to its introduction through a grid resistor 662 to the grid of a tube 664 which is preferably a gas tube. The plate of the tube 664 is connected through a load resistor 666 to a positive supply potential and is also connected through a condenser 668 to the shield grid 670 and cathode 672. The cathode 672 is returned to ground through a bias resistor 674 and is also connected to the positive supply line through a resistor 676.

The output of the tube 664 is coupled to a triode 676 by means of a further differentiator circuit consisting of a condenser 678 and resistor 680. The plate of triode 676 receives a supply of positive potential through a load resistor 682 connected to the positive supply lead 684 and the cathode is connected through a cathode resistor 686 to ground. The output of this tube is then fed through coupling condenser 688 and grid resistor 690 to the grid of a further triode 692. The plate of the tube 692 receives positive supply potential through a load resistor 694 and its cathode is connected to a grounded cathode resistor 696 and is also connected through a pair of parallel resistors 698 and 700 to the positive supply line 684. The output of this tube is in turn connected through coupling condenser 702 to a pair of clipping diodes 704 and 706.

The cathode of diode 704 is connected to a grounded cathode resistor 708 and to a resistor 710 which terminates in the positive supply lead 684. The diode 706 has its plate connected to a grounded resistor 712 and an output is taken from this resistor to a potentiometer 714 which has its variable contact connected to one terminal of a meter 92, which has its other terminal grounded. A condenser 716 is provided around the load resistor 712 and a large condenser 718 is connected around the indicating instrument 92.

The operation of the frequency channel is as follows. The signal from the translator circuit 620 is highly amplified and clipped in the tubes 638 and 652. This clipped signal then passes through the differentiator circuit consisting of condenser 660 and resistor 658 to provide peaked pulses for firing the tube 664. This tube operates in a similar manner to the tube 500 in the phase stroboscope channel to produce a substantially square wave output which consists of a constant positive voltage interrupted by sharp negative going peaks. The signal on load resistor 666 is then passed through a second differentiator circuit consisting of condenser 678 and resistor 680 to produce a sharp pulse which is amplified in the tubes 676 and 692. These pulses drive the tube 692 to saturation and cut-off so that the plate signal comprises a series of pulses of equal height and constant width. This signal is then fed to the diodes 704 and 706 which deliver positive pulses of a constant height and width to the indicating instrument 92 to produce an indication proportional to frequency. The potentiometer 714 is utilized as a calibrating adjustment.

It is important to note that the frequency indicating instrument 92 indicates the frequency of the vibration of maximum amplitude and does not necessarily indicate the frequency of firing of the phase stroboscope.

*The Speed Channel*

The speed channel 20 is connected to the engine distributor by means of a conductor 724 which terminates in a small coupling condenser 726 connected to the grid of the first amplifier tube 728 and to a grounded grid resistor 730. The plate of the triode 728 receives a supply of positive potential through a load resistor 732 and the cathode of the tube 728 is returned to ground through a cathode bias resistor 734. The output of this stage is coupled by means of a condenser 736 and grid resistor 738 to the grid of the following triode 740 and the plate of this tube receives its positive supply potential through a load resistor 742. The cathode of the tube 740 is returned to ground through a cathode bias resistor 744.

The signal received from the engine distributor is amplified by the tubes 728 and 740 and is preferably clipped thereby so that a generally square wave signal appears on the load resistor 742. This signal is fed to a pulse producing tube 746, which may preferably be a gas tube, through a differentiating circuit consisting of a condenser 748 and resistor 750 which have their mid-point connected to the grid 752 of the tube 746. This tube has its plate connected to a positive supply potential through a load resistor 754 and has its cathode returned to ground through a cathode bias resistor 756. A firing condenser 758 is connected between the plate and cathode of the tube and the shield grid 760 is connected to the cathode. A further resistor 762 connects the cathode to the positive supply potential.

The sharp negative going pulses which appear across the load resistor 754 are coupled to the following triode 766 through a further differentiating or pulse sharpening circuit consisting of a condenser 768 and resistor 770 which have their mid-point connected to the grid of the tube 766. This tube receives its plate supply potential through a load resistor 772 and has its cathode returned to ground through a cathode bias resistor 774. The output of the tube 766 is coupled to a further amplifier 776 through a condenser 778 and resistor 780. The plate of this tube receives a supply potential through the load resistor 782 and the cathode is returned to ground through a cathode bias resistor 784. The cathode is also connected through a pair of parallel resistors 786 and 788 to the positive supply lead.

The positive supply potential for the tubes 728, 740, 746, 766 and 776 is provided from a positive supply line 790 which is connected to the various load resistors through a series of decoupling resistors 792, 794 and 796 and decoupling condensers 798, 800 and 802.

The output from the final tube 776 is coupled to a pair of diode rectifiers 804 and 806 by means of a coupling condenser 808 and a resistor 810 which is connected between the lower terminal of the load resistor 782 and the cathode 812 of the diode 804. This cathode is further returned to ground through a resistor 814. The plate 816 of diode 804 is connected to the condenser 808 as is the cathode 818 of the diode 806. The plate 820 of the diode 806 is connected to a grounded load resistor 822 which is by-passed by a relatively large condenser 824. The signal appearing on the resistor 822 is fed to the engine speed meter 94 through a calibrating potentiometer 826 and a very large condenser 828 is provided in parallel with the engine speed meter.

The signal appearing across the load resistor 822 is also utilized as an input to the relay channel 22 which turns the speed stroboscope off when the engine is not running or when its speed is objectionably low. Thus the resistor 822 is connected by means of conductor 830 to a grounded potentiometer 832 connected to the grid 834 of a normally conducting tube 836 which has its cathode connected to ground. The plate of the tube 836 receives a positive supply potential through a load resistor 838 and the screen grid of this tube is connected through a pair of parallel resistors 840 and 842 to the positive supply lead 790. The screen grid is further connected to a grounded resistor 844. The signal appearing on the load resistor 838 is coupled through a decoupling resistor 846 to a relay tube 848 having its cathode connected through a resistor 850 to the other side of the load resistor 838. The cathode of the tube 848 is returned to ground through a cathode bias resistor 852, and the plate of the tube is connected to one terminal of the relay 96 which has its other terminal connected to the relay supply lead 222.

The relay 96 has a movable arm 854 which is normally in contact with a stationary contact 856 connected to ground. The movable arm 854 is connected by means of a conductor 858 to the conductor 860 connecting the speed stroboscope 30 to the timing channel 24 for a purpose to become apparent presently.

The operation of this circuit is as follows. The pulses received from the engine distributor are amplified and clipped in the tubes 728 and 740 and the clipped signal is differentiated by the condenser 748 and resistor 750 which serve as an input to the grid of the pulse producing tube 746. When the tube 746 is non-conducting the condenser 758 charges rapidly through the resistor 754 and 756 until it reaches the positive supply potential at which point it remains until a positive going pulse on the grid 752 triggers the tube 746 to cause the condenser 758 to rapidly discharge therethrough. This produces a sharp negative going pulse in the load resistor 754 and immediately thereafter the condenser 758 re-charges to repeat the sequence. The signal on the load resistor 754 is thus a positive voltage interrupted by a series of negative going pulses. This output is then passed through a second differentiator circuit consisting of condenser 768 and resistor 770 to produce sharp pulses which are amplified in the tubes 766 and 776. These pulses drive the tube 776 to saturation so that the plate signal comprises a series of pulses of equal height and constant width. This signal is then fed to the diodes 804 and 806 which deliver pulses of a constant height and width to the indicating instrument 894 to produce an indication proportional to engine speed. The potentiometer 826 provides a calibrating adjustment for the meter 94.

When the diode 806 conducts, current flows through the load resistor 822 and places a negative voltage on the grid 834 of the tube 836. The tube is conducting so long as there is insufficient negative voltage on its grid to cause it to cut-off, or in other words is conducting so long as the engine is not running or is running at a very low speed. When the tube 836 conducts the relay tube 848 is cut off so that the relay 96 is de-energized and the movable arm 854 is connected to the grounded contact 856 to prevent the speed stroboscope from firing. When the engine speed channel receives a sufficiently high input from the distributor, the tube 836 is non-conducting while the tube 848 is conducting to energize the relay 96 and break the contact between movable arm 854 and 856 to permit the speed stroboscope to fire.

*The Timing Channel*

Referring to FIGURE 7 there is shown the timing channel 24 which is utilized to fire the speed stroboscope at the precise frequency at which it is desired to test the engine. This circuit consists of a resonant reed oscillator 864 which is controlled by a pair of resonant reeds 866 and 868 mounted upon a suitable foundation 870. A first triode 872 has its grid connected to the upper terminal of a winding 874 which has its other terminal connected to ground. The plate of this tube receives a supply of positive potential through a load resistor 876 and its cathode is connected to ground through a cathode bias resistor 878. The load resistor 876 provides the input to the second triode 880 and is connected to the grid thereof through a coupling condenser 882, decoupling resistor 884 and grid resistor 886. The cathode 888 of this tube is connected by means of a conductor 890 to the upper terminal of a second coil 892 which has its lower terminal grounded. The plate of the triode 880 receives a supply of positive potential through a load resistor 894 which is by-passed to ground by a condenser 896. Positive supply potential is supplied to the load resistors 876 and 894 of both tubes through a supply line 898.

Output from this oscillator is taken from the load resistor 876 by means of a coupling condenser 900 and resistor 902 which are connected to the grid of a triode 904 by means of a decoupling resistor 906. The plate of the triode 904 receives a positive supply potential through the load resistor 908 and the cathode of the tube is returned to ground through a cathode resistor 910.

The output of this stage is further amplified and clipped by a tube 912 which is coupled to the load resistor 908 by means of a condenser 914, decoupling resistor 916 and grid resistor 918. The cathode of the tube 912 is connected to ground and the plate receives a positive supply potential through the load resistor 920.

The signal appearing on the load resistor 920 is fed through a differentiating network consisting of a condenser 922 and resistor 924 to a decoupling resistor 926 and thence to the grid 928 of a pulse producing tube 930, which may preferably be a gas tube. This tube receives a positive plate supply potential through load resistors 934 and 936 and has its cathode returned to ground through a cathode resistor 938. The cathode is also connected to the positive supply line through a resistor 940 and has the shield 942 connected thereto. A firing condenser 944 is provided across the plate and cathode of the tube 930, and a further firing condenser 946 is connected between the plate of the tube and ground.

The output of the pulse tube 930 is connected by means of a pair of condensers 948 and 950 to the grids 952 and 954 of a pair of triodes 956 and 958 which are connected in a conventional Eccles-Jordan binary circuit. Thus the plate of the tube 956 is connected through parallel resistor 960 and condenser 962 to the grid 954 of tube 958. Conversely the plate of tube 958 is connected through parallel resistor 964 and condenser 966 to the grid 952 of tube 956. The respective grids are connected to grounded grid resistors 968 and 970 and the cathodes are connected together and to a grounded cathode resistor 972. Positive potential is applied to the plates of the tubes through resistors 974, 976 and 978 and an output is taken at the juncture of the resistors 976 and 978.

The output from the scaler circuit is fed through a differentiator circuit consisting of a condenser 980 and resistor 982 to a decoupling resistor 984 connected to the grid 986 of a pulse producing tube 988. The tube 988 receives plate supply potential through a load resistor 990 and has its screen grid 992 connected to its cathode 994 and to the positive supply lead through a resistor 996. The cathode is in turn connected to ground through a cathode bias resistor 998. A condenser 1000 and the primary 1002 of the speed stroboscope firing transformer 1004 are connected between the plate and cathode of the tube 988 by means of leads 1006 and 1008. The secondary 1009 of the firing transformer 1004 is connected to the firing electrode 1010 of the speed stroboscope 30 and the other terminal thereof is connected to ground. A plate 1012 of the stroboscope tube 30 is connected to a source of positive supply by means of the lead 606 and a firing condenser 1014 is connected between the plate and ground. The cathode 1016 is connected to ground.

The positive supply potential for the tubes 930, 952, 958 and 988 is supplied from a supply line 1018 through a pair of decoupling resistors 1020 and 1022 and decoupling condensers 1024 and 1026.

Operation of this circuit is as follows. The resonant reed oscillator oscillates at a frequency determined by the resonant characteristics of the reed, which may be at a frequency of 50 cycles per second, and provides a signal of excellent stability without benefit of temperature control. The output of this oscillator is amplified and preferably clipped in the tubes 904 and 912 and differentiated by the condenser 922 and resistor 924 to provide a series of sharp pulses on the grid of the pulse producing tube 930. This tube is normally non-conducting and during the time that it is non-conducting the condensers 944 and 946 charge through the resistors 934, 936 and 938 to a potential equal substantially to the plate supply potential. At the moment that a positive pulse is applied to the grid 928 of the tube, the condensers 944 and 946 discharge through the tube to provide an output signal across the load resistor 936 which consists of a series of sharp negative going pulses. When the condensers 944 and 946 discharge through the tube the condenser 946 discharges more slowly through the cathode resistor 938 in order to prevent the tube 930 from fluctuating between a conducting and non-conducting condition as condenser 944 discharges. When the voltage across the tube 930 drops below the critical value it ceases to conduct and the condensers 944 and 946 again commence to charge. The condenser 944 and the resistors 934 and 936 are so chosen that the condenser charges rapidly and remains at substantially plate voltage except when discharging.

The negative going pulses thus produced are utilized to trigger the scaler circuit consisting of tubes 956 and 958 to produce a signal of exactly half the frequency produced in the oscillator 864, as for instance a signal of 25 cycles per second which, utilizing the oscillator shown, may be maintained stable to an accuracy of plus or minus 0.015 percent. The substantially square wave pulses produced by the scaler circuit are fed through a differentiator consisting of condenser 980 and resistor 982 to the firing tube 988 which operates substantially in the same manner as the pulse producing tube 930. Thus the condenser 1000 charges during periods of non-conduction through the load resistor 990 and transformer primary 1002 and discharges upon the application of a positive pulse to the grid of the tube 988 to produce a firing pulse in the secondary of the firing transformer 1004 which fires the stroboscope 30 to produce a speed indicating light. In order to avoid confusion and mistakes the light produced by the speed stroboscope 30 is preferably of a different color from that produced by the phase stroboscope 28 and may, for instance, be a red light while the phase stroboscope 28 produces a white light.

*The Governor Channel*

When using the sharply tuned amplifiers which have been found desirable in this unit the maintenance of accurate engine speed is critical and conventional governors are far too inaccurate and sluggish to provide the necessary control. The governor channel, shown in FIGURE 8, comprises a controller assembly 102 which consists of a meter movement, not shown, connected in series with the engine speed meter 94 to cause movement of a pointer 1030 in accordance with the voltage or current actuating the speed meter 94. The pointer 1030 moves over a meter face 1032 having a pair of spaced apertures 1034 and 1036 therein. A pair of stops 1038 and 1040 is provided on either side of the point 1030 and a pilot lamp 1042 is mounted adjacent the pointer in line with the apertures 1034 and 1036. A prism 1044 is provided on the other side of the meter face 1032 in alignment with the pilot lamp 1042 and a pair of photoelectric cells 1046 and 1048 are mounted on either side of the prism to receive light therefrom. As the tear drop shaped hand of the meter pointer 1030 moves across the meter face it alternately covers one aperture or the other so that when it is in either limiting position either aperture 1036 or 1034 passes light to the prism 1044 and to the respective photoelectric cell. The control assembly is so adjusted that when the engine is running at precisely the desired speed the pointer centers itself between the apertures so that substantially equal amounts of light are picked up by photocells 1046 and 1048. The photocells 1046 and 1048 each have one terminal thereof connected to a positive supply lead 1050 and have their other terminals connected to grounded resistors 1052 and 1054 respectively.

The resistor 1052 is connected through a decoupling resistor 1056 to the grid 1058 of a sharp cut-off pentode 1060 which has its plate connected through a load resistor 1062 to the positive supply lead 1050. The cathode of this tube is connected through a cathode bias resistor 1064 to ground and is also connected through a further resistor 1066 to the positive supply lead 1050. The screen grid 1068 is connected through a resistor 1070 to ground and is also connected through a pair of parallel resistors 1072 and 1074 to the positive supply lead 1050.

The output of the sharp cut-off pentode 1060 which appears across resistor 1062 is directly coupled by a resistor 1076 to the grid of a relay control triode 1078 which has its plate 1080 connected to one terminal of a relay 1082, the other terminal of which is connected through a lead 1084 and connection 1086 to the relay supply lead 1208. The cathode of the triode 1078 is returned to ground through a cathode resistor 1088 and is also connected to the positive supply lead 1050 through a resistor 1090.

The relay 1082 is provided with a pair of movable arms 1092 and 1094 which have associated therewith stationary contacts 1096, 1098 and 1100, 1112 respectively. The uppermost stationary contact 1096 is connected to ground as is the upper contact 1100 which is associated with the movable arm 1094. The contact 1112 is connected through a resistor 1114 to the positive supply lead 1050. The movable arm 1092 is connected by means of a lead 1116 to one terminal of the governor motor 104 while the other movable arm 1094 is connected by means of a conductor 1118 to a condenser 1120 and resistor 1122 which serve as an input to the relay triode 1124.

The triode 1124 receives a supply of positive potential through the relay 116 which is connected to the relay supply line 1208 through conductors 1126 and 1086. The cathode of the relay triode 1124 is returned to ground through a cathode resistor 1128 and is connected to the positive supply lead 1050 through a resistor 1130.

The relay 116 has a pair of movable arms 1132 and 1134 which have stationary contacts 1136 and 1138 associated therewith. The movable arm 1132 is connected by means of a conductor 1140 to a low voltage lamp supply source, while the movable arm 1134 is connected through conductor 1142 to the positive supply lead 1050. The stationary contact 1136 associated with movable arm 1132 is connected by means of conductor 1144 to the lamp 120 which indicates whether or not the distributor or governor are operating properly.

The output of the photoelectric cell 1048, which is developed across the resistor 1054, is connected through a decoupling resistor 1148 to the grid 1150 of a sharp cut-off pentode 1152. The pentode 1152 has its plate connected to the positive supply lead 1050 through a load resistor 1154 and its cathode returned to ground through a cathode resistor 1156. The cathode is further connected to the positive supply 1050 through a resistor 1158. The screen grid 1160 is connected to the positive supply lead through a pair of parallel connected resistors 1162 and 1164 and is connected to ground through a resistor 1166.

The output of this stage is fed through a resistor 1168 to the grid of a relay control tube 1170 which has its plate connected to the relay 1172, the other terminal of which is connected by conductor 1174 to the relay supply conductor 1208. The cathode of the triode 1170 is returned to ground through a cathode resistor 1176 and is connected to the positive supply through a resistor 1178.

The relay 1172 is provided with a pair of movable arms 1178 and 1180 which have associated therewith pairs of stationary contacts 1182, 1184 and 1186, 1188 respectively. The contacts 1182 and 1186 are connected to ground while the contact 1184 is connected by conductor 1190 to the contact 1098 of the relay 1082 in the relay channel associated with the photoelectric cell 1046. The contact 1188 associated with the movable arm 1180 is connected through resistor 1192 to the positive supply lead 1050. The movable arm 1178 is connected through conductor 1194 to the other terminal of governor motor 104 and the movable arm 1180 is connected through conducter 1196 to a condenser 1198 and resistor 1200.

The resistor 1200 provides an input to the relay triode 1202 which has its plate connected to one terminal of the relay 118 and its cathode connected to ground through the cathode resistor 1204 and to the positive supply lead 1050 through the resistor 1206. The other terminal of the relay 118 is connected to the relay supply lead 1208.

The relay 118 is provided with a pair of movable arms 1210 and 1212 which are connected respectively to a low voltage lamp supply source and through conductor 1214 to the positive supply lead 1050. Each movable arm has a stationary contact 1216 and 1218 respectively associated therewith and the contact 1218 is connected to the contact 1138 of the relay 116. These commonly connected contacts 1138 and 1218 are further connected to a resistor 1220 which is connected by lead 1222 to the upper terminal of the resistor 1224 in the motor pulser unit 1226.

The motor pulser unit 1226 consists of a relay 1228 connected in parallel with a large condenser 1230 which is connected to the resistor 1224 and to a movable relay arm 1232. The relay 1228 has a further movable arm 1234 which is connected by means of conductor 1236 to a source of direct current supply for the governor motor 104. The movable arms 1232 and 1234 have stationary contacts 1238 and 1240 associated therewith respectively and the contact 1238 is connected to ground while the contact 1240 is connected through conductor 1242 to the stationary contact 1098 of relay 1082 in the channel associated with the upper photoelectric cell 1046.

The stationary terminals 1136 and 1216 of the relays 116 and 118, respectively, are connected together by means of conductor 1144 and are connected to one terminal of a relay 106, the other terminal of which is grounded. The relay 106 is provided with three movable arms 1246, 1248 and 1250, and each movable arm is provided with a stationary contact 1252, 1254 and 1256, respectively, the contacts 1254 and 1256 being connected to ground. The movable arm 1246 is connected by means of conductor 1258 to a low voltage source of lamp supply while the movable arms 1248 and 1250 are connected through conductors 1260 and 1262 to the amplitude meter lead 404 and to the phase stroboscope lead 590, respectively, as may be seen in FIGURES 1, 3 and 8. The contact 1252 of relay 106 is connected by means of lead 226 to the movable arm 214 of relay 52 and to the corresponding movable arm of the relay 76.

The operation of this circuit is as follows. As long as the motor is running at the proper balancing speed the pointer 1030 in the control assembly 102 is substantially centered between the apertures 1034 and 1036 so that both photoelectric cells 1046 and 1048 provide input signals to the pentodes 1060 and 1152 respectively. These input signals render both pentodes conducting so as to place a low positive voltage on the grids of the relay tubes 1078 and 1170. Since the cathodes of these tubes are connected to the positive supply through resistors 1090 and 1178, these tubes are maintained non-conducting and the relays 1082 and 1172 are de-energized. Under these circumstances the governor motor leads 1116 and 1194 are connected through movable arms 1092 and 1178 to ground so that the governor motor remains stationary.

If the engine is running below the proper balancing speed the meter pointer 1030 will move in response to the drop in current flowing through the speed meter 94 and will move upward to cover the top aperture 1036. This removes the firing potential from the grid 1058 of the pentode 1060 and renders it non-conductive which in turn causes the relay tube 1078 to fire to energize the relay 1082 thereby causing movable arms 1092 and 1094 to engage contacts 1098 and 1112 respectively. The governor motor lead 1116 is now connected through movable arm 1092, contact 1098 and conductor 1242 to the contact 1240 of relay 1228 in the governor motor pulsing assembly 1226.

During the entire time that the governor channel is turned on the relay 1228 receives a supply of positive potential from the positive supply lead 1050 through the resistor 1224. The other terminal of the relay is connected to ground through the movable arm 1232 and contact 1238. When positive potential is applied to the resistor 1224 and relay 1228 which has condenser 1230 in parallel therewith, the condenser 1230 begins to charge and the relay 1228 closes its contacts at a time dependent upon the values of the resistor 1224 and condenser 1230. As soon as the relay closes its contacts the connection between movable arm 1232 and stationary contact 1238 is broken deenergizing the relay 1228 and permitting the condenser 1230 to discharge through the relay winding 1228. Upon deenergization of the relay, the contacts, which are normally in the position shown, again revert to their rest position permitting condenser 1230 to again charge and repeat the process so that the relay opens and closes at a rate determined by the values of the resistor 1224 and condenser 1230.

Bearing this continuous opening and closing of the relay 1228 in mind, it will be seen that in the previously discussed condition where the engine is running below the desired speed and the pointer 1030 has covered the aperture 1036 to energize the relay 1082 and connect the governor motor lead 1116 to the stationary contact 1240 in the relay 1228, a pulsed voltage is applied to the governor motor from the governor motor supply lead 1236, since the other governor motor lead 1194 remains grounded because light flows through aperture 1034 to maintain the relay 1172 deenergized.

The shaft of the governor motor is connected through a suitable connecting mechanism to the throttle of the engine under test and the energization received when relay 1082 is energized and relay 1172 is deenergized causes the motor to jog in a direction to raise the engine speed. When the speed has been raised again to the proper value the current flowing through the speed meter 94 and control assembly 102 causes the pointer 1030 to again assume its position mid-way between the apertures 1034 and 1036 causing deenergization of relay 1082 thereby again grounding both governor motor leads 1116 and 1194 to deenergize the governor motor. Thus while the pulsing assembly relay 1228 continues to be energized and deenergized the governor motor remains stationary.

Since, in the above assumed condition, the pointer 1030 covers the aperture 1036 and energizes the relay 1082 for a finite period of time while the governor motor raises the engine speed, the capacitor 1120 is connected to the positive supply lead 1050 through the resistor 1114 and charges toward the voltage on the supply lead 1050. When the charge on the condenser 1120 reaches a predetermined value the normally non-conducting relay tube 1124 is caused to conduct and thereby energize the relay 116. This causes closure of the contacts 1134 and 1138 in relay 116 to connect the resistor 1220 in parallel with the resistor 1224 in the pulsing unit 1226 through a circuit which may be traced as follows; from the upper terminal of resistor 1224 through lead 1222 to the lower terminal of resistor 1220 and from the upper terminal of resistor 1220 through contacts 1138 and 1134 and conductor 1142 to the positive supply lead 1050 which is connected to the lower terminal of the resistor 1224. Insertion of this resistor reduces the effective value of the resistance in series with the parallel capacitor 1230 and relay 1228 and increases the rate of charging of the capacitor 1230 thereby increasing the rate of pulsing the governor motor 104 to raise the speed of movement of the motor and connected throttle.

At the same time energization of the relay 116 causes closure of contacts 1132 and 1136 to apply potential to the lamp 120 which indicates that the engine is running at a speed removed from the proper balancing speed by an amount in excess of the normal hunting variance. Closure of contacts 1132 and 1136 also applies power to the relay 106 to cause it to close and perform the following switching operations. The contacts 1246 and 1252 are opened breaking the supply of lamp voltage through the lead 226 to the contacts of the relays 52, 62, 76 and 86 of the amplitude channels 10 and 12 so that the indicating lights are all deenergized. Closure of contacts 1248 and 1254 results in a grounding of the lead 404 of the amplitude meter 34 in the hand unit 26 so as to prevent that meter from showing any reading. Closure of contacts 1250 and 1256 results in a grounding of the lead 590 to the phase stroboscope to prevent that lamp from firing. When the motor is again brought to the proper balancing speed by the governor motor, light again strikes the photoelectric cell 1046 to render pentode 1060 conducting and triode 1078 non-conducting to deenergize relay 1082. This causes condenser 1120 to discharge through contacts 1094 and 1100 to ground, thereby rendering triode 1124 non-conducting and deenergizing relay 116. This deenergizes the lamp 120 and relay 106 to again permit functioning of the phase stroboscope, amplitude meter and the lamps in the amplitude channels.

When the engine under test operates at too high a speed the pointer 1030 covers the lower aperture 1034 thereby cutting off light from the photoelectric cell 1048 and causing the channel consisting of tubes 1152, 1170 and 1202 to operate in a manner similar to that described above where the engine operated below the desired speed. Under these circumstances the governor motor is supplied with a similar pulsed voltage but the alternate governor motor lead is grounded so as to cause the governor motor to rotate in the opposite direction. The governor channel thus functions not only to maintain the engine on the preset speed but also to deenergize the indicating lamps, amplitude meter and stroboscope when the engine is excessively off of the desired speed.

While the foregoing governor channel provides for deenergizing the phase strobe light 28 when the speed of the engine is removed by a predetermined maximum from the desired speed, a certain degree of hunting is inevitable and the phase strobe light fires at some speeds which are not exactly at the preset value. Despite this unavoidable hunting I have found that extremely accurate indications of the position of unbalance may be obtained if the phase stroboscope is controlled to fire in bursts only when the speed of the engine is within one or two r.p.m. of the desired speed. A device for accomplishing this is shown in FIGURES 18 and 19 in the form of an alternative embodiment of the phase strobe light de-energizing relay 106.

Figure 18:
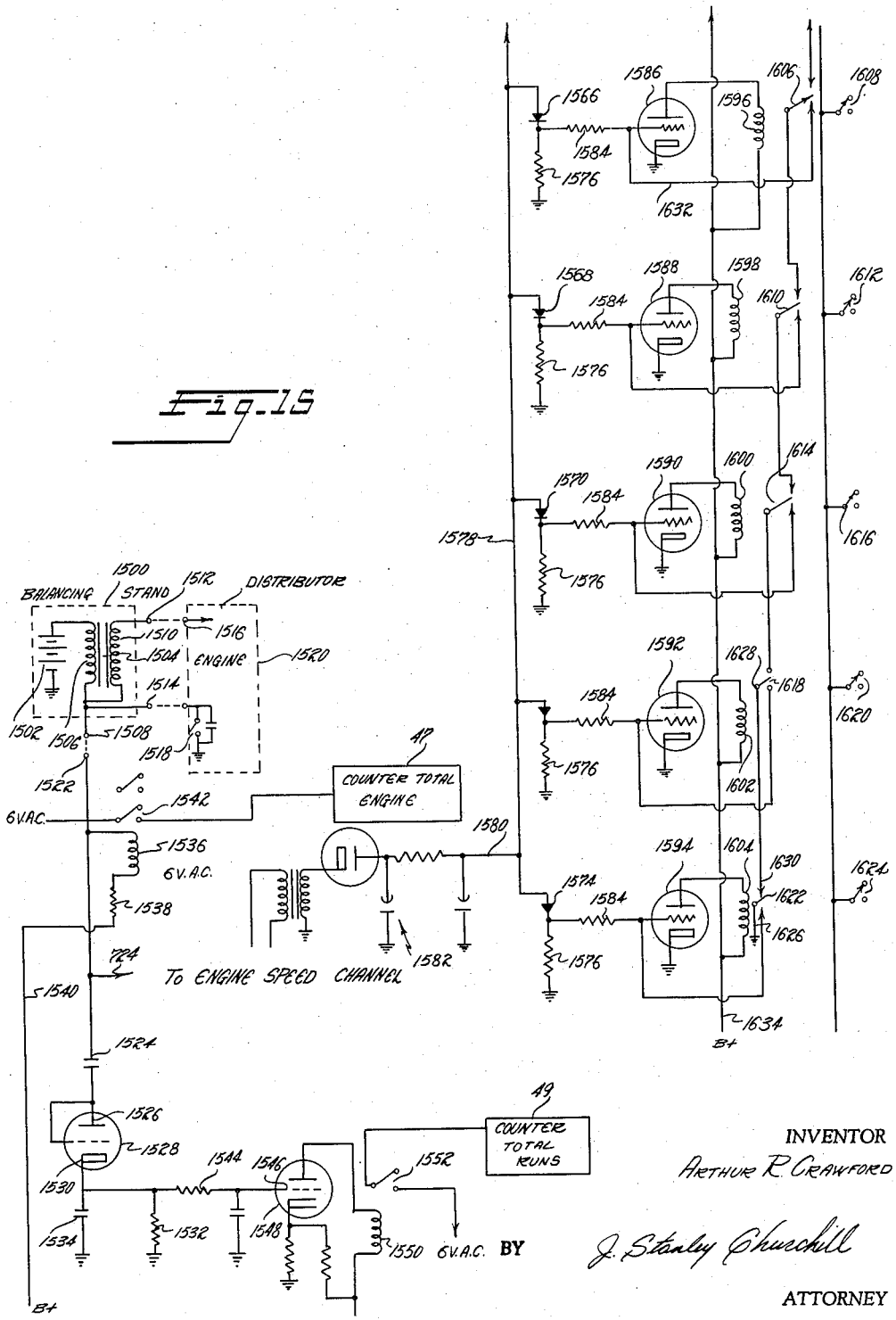
FIGURE 18 is a circuit diagram of another embodiment of a control circuit for the governor channel.

Thus referring to FIGURE 18 there is shown a control meter 2010 which has its energizing coil 2012 connected to load resistor 822 in the twin diode circuit of engine speed channel 20. The other terminal of the energizing coil 2012 is connected to a similar load resistor 2014 across which appears the output from a pair of diodes 2016 and 2018 which are driven by the timer 24. The connection and operation of the diodes 2016 and 2018 is similar to the connection and operation of diodes 804 and 818 in the engine speed channel and will not be described further in detail. The output signals on load resistors 822 and 2014 are so adjusted that when the engine is running at precisely the desired speed the signals fed to energizing coil 2012 cancel one another so that the meter remains in its central or at rest position.

The control meter 2010 is of the same general type as that described in more detail in connection with the statistical analyzer and is provided with a single centrally located aperture 2020 behind which is mounted a photocell 2022 shown in FIGURE 19. A light source is placed on the other side of the pointer so that when the pointer is in its deactivated or central position as shown in FIGURE 18 no light reaches the photocell 2022, but when the pointer moves from this position the photocell is energized by light from the source.

Referring to FIGURE 19 it will be seen that the photocell 2022 is connected to a source of negative voltage and thence through a load resistor 2024 to ground. The junction of photocell 2022 and resistor 2024 is fed as an input to triode 2026 and this triode has a relay 2028 connected in its plate circuit. As long the photocell 2022 is not illuminated it forms a high resistance and allows the triode 2026 to conduct to energize relay 2028. When the phototube 2022 is illuminated by the pointer moving from a position covering aperture 2020 the phototube becomes a low resistance, tube 2026 cuts off, and relay 2028 is deenergized to allow the phase stroboscope to be grounded through switch 2030. The action of this circuit is immediate and it can be made sensitive enough to cause the phase stroboscope to fire only when the engine speed is within one r.p.m. of the desired speed.

The Power Supply

The power supply unit shown in FIGURE 9 consists of three power transformer 1270, 1272 and 1274 which have their primaries connected through a switch 1276 to a source of alternating current supply, not shown. The transformer 1270 has a high voltage secondary 1278 with a pair of terminals 1280 and 1282 connected to the plates of the full wave rectifier tube 1284. The winding 1278 also has a tap 1286 mid-way between the terminals 1280 and 1282 connected to ground. The filament 1288 of the rectifier 1284 is supplied with power from a filament winding 1290 and one terminal thereof is connected to a filter section consisting of a pair of serially connected resistors 1292 and 1294 shunted by condensers 1296 and 1298. The unregulated voltage thus produced is fed through a lead 1300 to the leads 222, 1208 and 790 to supply positive voltage to the rear amplitude channel, the governor channel and the speed channel.

This voltage is also fed to a voltage regulating unit which consists of a regulator tube 1302, a pair of cascaded triode control tubes 1304 and 1306 and a glow tube 1308. The voltage from the preceding filter unit is connected through a grid resistor 1310 to the control grid of the regulator tube 1302 and is also connected to the plate of the first triode control tube 1304. The regulator 1302 has its plate conected to the unregulated supply voltage from the filter. The cathode of the regulator tube is connected to the regulated positive supply lead 1312 thereby placing the regulator tube in series with the load current.

The first control tube 1304 has its cathode connected to the plate of the second control tube 1306 and this tube in turn has its cathode connected to the plate of the glow tube 1308. The cathode of the glow tube is grounded thus placing the tubes 1304, 1306 and 1308 in series between resistor 1310 and ground.

The first control tube 1304 has its grid connected through a resistor 1314 to the cathode of the regulator tube 1302 and this in turn is connected to a large grounded condenser 1316. The grid of this first control tube 1304 is also connected through a resistor 1318 to the grid of the second control tube 1306, and this grid receives a ripple input through the coupling condenser 1320. The grid of the tube 1306 is also connected to a grounded grid resistor 1322. A starting resistor for the glow tube 1308 is provided between the cathode of the tube 1306 and the cathode of tube 1302.

The output of the regulator is fed through connection 1312 to plate supply lines 684, 572, 790, 1050 and 1018 which provide plate supply voltage for the frequency channel, the phase stroboscope channel, the speed channel, the governor channel, and the timing channel. A further power lead is taken from the plate of the glow tube 1308 which is connected to cathode of the regulator tube 1306 through a resistor 1323 by the line 898 when connects to the oscillator tubes 872 and 880 in the speed channel.

The operation of this circuit is as follows. When the low voltage increases, the value of the negative voltage on the grid of the control tubes decreases, thereby increasing the plate current of these tubes. The resulting increase of voltage across the resistance 1310 makes the grid of the regulator tube 1302 more negative thereby reducing the plate current of the tube 1302 and tending to reduce the output voltage. The grid of the second control tube 1306 is capacitively coupled to the supply voltage through condenser 1320 and the action of this tube limits the ripple content.

The winding 1278 of the transformer 1270 is provided with a further terminal 1324 which is connected to the plate of the diode rectifier 1326 which feeds a filter consisting of series resistors 1328 and 1330 which are by-passed to ground by means of a filter condenser 1332. The output of this filter is fed by means of conductor 606 to the phase and speed stroboscope lamps.

A further secondary winding 1334 is provided on the transformer 1270 to provide the low voltage necessary for operating the various lamps.

The transformer 1272 is provided with a high voltage secondary 1336 having its outer terminals 1338 and 1340 connected to the plates of a full wave rectifier 1342 and having a center tap 1344 connected to ground. The rectifier 1342 receives its filament supply from a further secondary winding 1346 and this feeds a filter section 1348 similar to the corresponding section in the secondary circuit of the transformer 1270. The output of the filter circuit 1348 is fed to a regulator 1350 which is identical to that shown in the circuit of transformer 1270 and this regulator provides a regulated output voltage which is fed to leads 152 and 296 to provide plate supply voltage for the rear amplitude check channel and rear amplitude measuring channel and for the corresponding units in the front amplitude channel.

The transformer 1274 has a secondary winding 1252 connected to a bridge rectifier circuit 1254 which may utilize chemical type rectifiers. The output of this circuit is taken along a conductor 1256 and is by-passed to ground by means of a condenser 1258. This output provides the governor motor supply voltage over the lead 1236.

The Engine Balance Classifier

Figure 11:
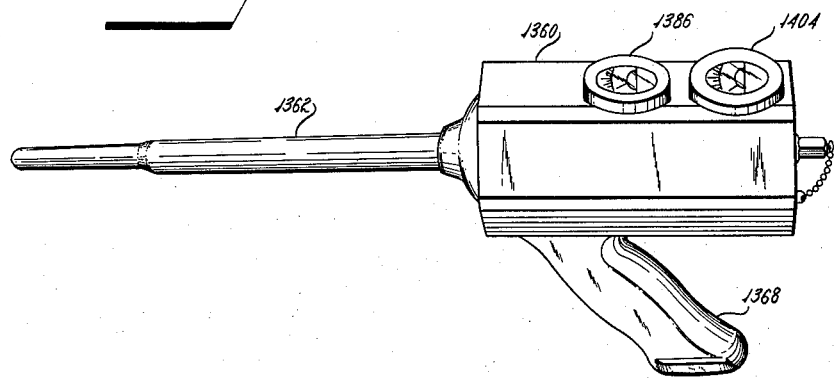
FIGURE 11 is a perspective view of the engine classifier.

Referring to FIGURE 11 there is shown a perspective view of a preferred embodiment of the engine balance classifier. The classifier includes a casing 1360, a probe 1362, an unbalance indicating meter 1386, and an engine speed indicating meter 1404. The casing 1360 contains a transducer and the associated circuitry for the transducer and meter, and is mounted upon a pistol grip type handle 1368.

Referring to FIGURE 10 there is shown the circuit diagram of the unbalance indicator in the engine balance classifier. A transducer or pick-up 1370 which is of the resonant type and is tuned to a preselected frequency such as, for example, 25 cycles per second plus or minus one cycle per second, has its upper lead connected to a chemical rectifier 1372, which may be of the germanium type, and has its lower lead connected to ground. The other terminal of the rectifier 1372 is connected to a large grounded condenser 1374 and also to a pair of potentiometers 1376 and 1378 which have their variable taps connected to the stationary contacts 1380 and 1382 of a switch having a movable arm 1384. The movable arm 1384 is connected to a grounded meter 1386 for indicating when a particular engine is in need of balancing.

Since according to the invention the transducer 1370 is tuned to the desired frequency and acts as a filter, the signal produced is generally a sine wave and is subjected to half wave rectification by the rectifier 1372. The pulses which pass this rectifier tend to maintain the condenser 1374 in a charged condition and the voltage thereacross actuates the unbalance indicator 1386. The switch 1383 switches the meter 1386 from one potentiometer to the other and these potentiometers are utilized to calibrate the meter 1386 for the allowable vibration in the front and rear end of the engine under test. It has been found that automobile engines have different vibration tolerances at the different ends and these potentiometers permit one meter scale to give an accurate reading for both. Thus when the operator actuates the movable arm 1384 of the switch 1383 to select "front" or "rear" he automatically provides a standard for the unbalance indicator so that he does not have to read vibration amplitude in quantitative units but may merely make a simple "satisfactory," "unsatisfactory" type of reading.

Figure 12:
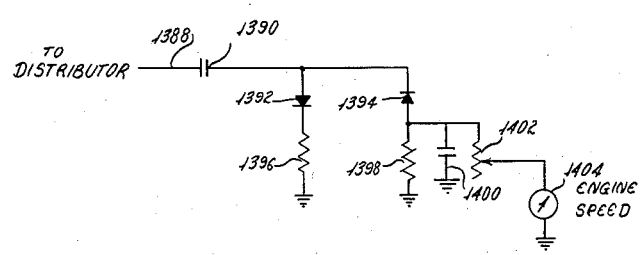
FIGURE 12 is a circuit diagram of the speed indicator in the engine classifier.

Referring to FIGURE 12 there is shown the circuit diagram of the engine speed indicator which is also housed within the engine balanced classifier casing 1360. A terminal 1388 is provided on the classifier housing for connection by the operator to the engine distributor. This terminal is connected by a condenser 1390 to a clipping stage consisting of rectifiers 1392 and 1394 which are connected to ground through resistors 1396 and 1398. The output is taken across the resistor 1398 which is paralleled by a condenser 1400 and connected to a potentiometer 1402 which has its movable lead connected to one terminal of a grounded engine speed meter 1404.

The signal from the distributor produces a voltage across the resistor 1398 which tends to maintain the condenser 1400 in a charged condition and the voltage thereacross is read by means of the engine speed meter 1404. The potentiometer 1402 is utilized as a calibration adjustment.

Statistical Analyzer

Referring to FIGURES 14 and 15 and more particularly to FIGURE 15, each balancing stand 1500 is provided with an engine starting battery 1502 and distributor transformer 1504. One terminal of the battery is grounded while the other terminal is connected to the secondary 1506 of the transformer 1504. The other terminal of the secondary 1506 terminates in a connector receptacle 1508 and is also connected to one terminal of the transformer primary 1510. The other terminal of the primary 1510 is connected to an outlet receptacle 1512, while the common terminals of secondary 1506 and primary 1510 are also connected to a connector 1514. The terminals 1512 and 1514 in the balancing stand are provided with suitable connectors for easy connection to the distributor terminal 1516 and starting switch 1518 of the engine 1520.

The terminal 1508 in the balancing stand is adapted to be connected to a plug 1522 on the balancing unit just prior to the time an engine is checked. The plug 1522 is connected through a blocking condenser 1524 to the plate 1526 of a diode connected triode 1528 which has its cathode 1530 returned to ground through a load resistor 1532 which is by-passed by condenser 1534. A relay 1536 is also connected to the plug 1522 and through resistor 1538 and lead 1540 to a supply of positive voltage.

It will thus be seen that when the plug 1522 is inserted into the receptacle 1508 in the balancing stand 1500 the supply of positive voltage on conductor 1540 is returned to ground through resistor 1538, relay 1536, plug 1522, receptacle 1508, transformer secondary 1506, and battery 1502. This energizes relay 1536 causing normally open switch 1542 to close to connect the total engine counter 47 to a supply of energizing voltage.

It will also be seen that when the balancing stand 1500 is connected to the engine 1520 through connectors 1512 and 1514 the starting battery 1502 is connected into the ignition circuit so that upon closing switch 1518 the engine 1520 may be started. When the engine is running the high frequency voltage upon the distributor is transmitted through transformer 1504 and blocking condenser 1524 to the plate of tube 1528 to place a direct current voltage upon load resistor 1532. This voltage on load resistor 1532 is transmitted through a resistor 1544 to the grid 1546 of a triode 1548 having a normally de-energized relay 1550 in its plate circuit. The relay 1550 controls normally open switch 1552 and this in turn is connected to supply an actuating voltage to the total run counter 49. When the engine 1520 is started and a distributor signal is transmitted through tube 1528 to load resistor 1532 the tube 1548 conducts to close switch 1522 and actuate the total run counter 49.

Referring now to FIGURES 16 and 17 there is shown a control meter 1555 comprising an arcuate scale 1556 having a series of equally spaced apertures 1558 therein. A pointer 1560 actuated by the meter movement, not shown, has a small disc 1562 at the end thereof to cover apertures 1558. A light source 1564 is mounted upon one side of the disc 1562 and scale 1556, while a series of photoelectric cells 1566 are mounted opposite each of the apertures 1558. The light source 1564 and photocells 1566 are so placed that light from the source 1564 impinges upon each of the photocells 1566 except the one photocell directly behind the aperture covered by the disc 1562. Thus one photocell is always darkened while the remaining photocells are always illuminated when the statistical analyzer is in operation. The meter movement actuating the pointer 1560 is connected in series with the amplitude meter 34 by leads 405 and 407 as seen in FIGURE 3.

Referring now to FIGURE 15 a series of photocells 1566, 1568, 1570, 1572 and 1574 are shown, it being understood that these photocells are shown as illustrative examples and that any additional number may be utilized. Each of the photocells has its plate connected to ground through a resistor 1576 and has its cathode connected through conductor 1578 to the negative terminal 1580 of a power supply 1582. Each of the photocells has its plate connected through a coupling resistor 1584 to the grid of a series of triodes 1586, 1588, 1590, 1592 and 1594, and the cathodes of these tubes are connected to ground. A supply of positive voltage is fed from lead 1634 to the plates of each of the foregoing tubes through a series of relays 1596, 1598, 1600, 1602 and 1604 and each of the relays actuates a pair of normally open switches numbered from 1606 to 1624 respectively.

The movable contact of the switch 1622 on the lowermost relay 1604 is connected to ground at 1626, while the moveable contact on each of the corresponding preceding switches 1606 through 1618 is connected to the upper contact of the switch below it. Thus the movable contact 1628 of switch 1618 is connected to the stationary contact 1630 of switch 1622 and the other switches are connected accordingly.

As long as light from the source 1564 reaches the various photocells the grids of their respective tubes are maintained at a high negative voltage so that the tubes are non-conducting. When, however, the disc 1562 intercepts the light from the source 1564, the photocell involved becomes a high resistance so that the grid of its tube swings in a positive direction to cause the tube to conduct. As an example, consider that illumination is shut off from the uppermost photocell 1566 in FIGURE 15 thereby causing triode 1586 to become conductive. This causes energization of relay 1596 and closure of switch 1606 thereby connecting the grid of tube 1586 to ground through conductor 1632, switch 1606, and the upper contacts of switches 1610, 1614, 1618 and 1622 and this holds tube 1586 in a conducting condition until one of the foregoing switches is opened. Actuation of relay 1596 also closes switch 1608 for a purpose presently to become apparent.

Assume now that photocell 1566 is the lowermost photocell on the meter scale, i.e. the photocell covered by the disc in FIGURE 16, and that the meter reading causes the pointer 1560 to swing upward past photocell 1566 to photocell 1570. It will be seen that the intermediate photocell 1568 will have its light supply momentarily cut off thereby energizing its relay 1598 to unground the grid of tube 1586 thereby permitting it to again become non-conductive.

The same action which breaks the ground connection of the grid of tube 1586 grounds the grid of the following tube 1588 and it remains in this condition until the light supply to the following photocell 1570 is interrupted to cause energization of its relay. In the assumed circumstance where the disc 1562 swings past photocells 1566, 1568 and stops at photocell 1570, tube 1586 will first become conducting and will cease conducting when the disc moves in front of the photocell 1568 to energize its relay and thereby unground the grid 1586. Tube 1588 will likewise become non-conducting when the disc blocks the light to photocell 1570 to thereby cause its tube 1590 to conduct and energize the relay 1600 to disconnect the grid of tube 1588 from ground. Tube 1590 then remains conducting and relay 1600 remains energized until the pointer moves upwardly to cause the following tube to fire or until the supply of positive power is removed from the lead 1634. The lead 1634 is connected to a normally closed switch 1636 seen in FIGURE 14 and this switch opens the grid holding circuits of the tubes 1586 through 1594 after the counters have been pulsed as shall presently be seen.

Referring now to FIGURE 14 the switches 1608 through 1624 of FIGURE 15, which are controlled by the relays 1596 through 1604 in the plate circuits of tubes 1586 through 1594, are shown in a block 1800 and the control circuits for relays 1536 and 1550 of FIGURE 15 are shown as blocks 1802 and 1804 for simplicity.

The relay 1536 which is energized each time the balancing unit is plugged into the balancing stand controls a switch 1806 which has its movable contact connected through a condenser 1808 to ground. The upper stationary contact of switch 1806 is connected to a grounded relay 1810, while the lower stationary contact of switch 1806 is connected to a supply of positive voltage. The relay 1810 controls a pair of switches 1812 and 1814. The movable contact of switch 1814 is connected through a condenser 1816 to ground while the movable contact of switch 1812 is connected through conductor 1818 to a source of counter actuating voltage. The upper stationary contact of switch 1814 is connected to a further grounded relay 1820 while the lower stationary contact of switch 1814 is connected to a supply of positive voltage. The lower stationary contact of switch 1812 is connected to a conductor 1822 which provides energizing voltage to the counters in a manner presently to be explained. The relay 1820 controls a switch 1824 which has its movable contact connected to conductor 1818 and thence to the supply of counter actuating voltage. The upper stationary contact of switch 1824 is connected through a conductor 1826 to holding circuits on the counter actuator relays as shall presently be described.

It will now be apparent to those skilled in the art that insertion of the engine analyzer plug 1522 into the receptacle 1508 in the balancing stand 1500 causes energization of relay 1536 (FIGURE 15) to close switch 1542 and thereby cause the total engine counter 47 to advance one count. Energization of relay 1536 also causes condenser 1808 (FIGURE 14) to be connected to a supply of positive voltage through the switch 1806 and to remain connected to that supply of positive voltage as long as the plug 1522 remains in the receptacle 1508 in the balancing stand.

Starting the engine 1520 places a distributor signal on the load resistor 1532 in the cathode circuit of tube 1528 thereby causing energization of relay 1550 to close switch 1552 and advance the total run counter 49 one count.

When the plug 1522 is removed from the receptacle 1508 in the balancing stand 1500 relay 1536 is de-energized thereby connecting the relay 1810 across condenser 1808 through switch 1806 to allow the condenser to discharge therethrough to momentarily energize this relay. When the relay 1810 is energized the switch 1812 closes to apply a pulse of counter actuating voltage to the conductor 1822. Simultaneously switch 1814 connects condenser 1816 to the supply of positive voltage and then releases the connection to connect the charged condenser to relay 1820 causing it to energize momentarily thereby opening switch 1824 to break the holding circuits of the counter actuating relays connected to lead 1826.

Turning now to the counter and indicator lamp section of the statistical analyzer shown in FIGURE 14 there are seen a series of counters 43 for the front end and a series of counters 45 for the rear end. There is a similar series of indicator lamps 39 for the front end and a series 41 for the rear end. The counters in each series indicate the number of engines which are out of balance by a specific weight or torque and thus the first counter 1830 in the series 45 may indicate the number of engines having an unbalance force of zero ounce-inches or at least less than one-half ounce-inch. The following counter 1832 indicates the number of engines having an unbalance force of one-half ounce-inch while the remaining counters make similar records in one-half ounce-inch increments. The indicator lights in groups 39 and 41 which are associated with the counters are provided with suitable weight markings to indicate to the operator just how much weight must be added to the particular engine under test in order to bring it into a satisfactory balance. Thus these lamps may either be marked with numerical weight designations or, in the interest of even further simplicity, may be marked with alphabetical symbols, such as, "A, B, C, etc." Weights with corresponding designations may be supplied to the operator and he may then balance an engine without ever knowing the numerical unbalance involved, although he could easily ascertain this from the instrument.

When the photocell operated switches 1608 through 1624, and 1834 through 1842 (which are not shown in FIGURE 15) are closed by the darkening of their associated phototubes, the indicating lights are immediately energized and the counters are placed in readiness for pulsing. Thus consider the case where the pointer 1560 on the control meter 1555 is caused by its signal to move across three apertures to come to rest in front of the third aperture. In the at-rest condition the disc 1562 of the control meter covers the lowermost aperture which is associated with uppermost switch 1834 in the block 1800 in FIGURE 14, causing this switch to close. Each of the switches 1834, 1836, 1838, etc. is connected to an associated switch 1844, 1846 through 1862 and these switches are all actuated by the front-rear relay, being in the upper position when this relay is in its rear connection and in the lower position when this relay is in its front connection. The upper terminal 1864 of uppermost switch 1844 is connected to one terminal of the indicator lamp 1866 and to one terminal of a relay 1868 and the other terminals of the lamp and relay are connected to ground. The relay 1868 actuates a pair of switches 1870 and 1872 which are counter conditioning and relay holding switches respectively. The switch 1870 has its stationary contact connected to the zero ounce-inch counter 1830 and has its movable contact connected by means of conductor 1874 to the upper stationary contact of switch 1876 operated by the relay 1878 in the following counter and indicator stage. The lower stationary contact of switch 1872 is connected by conductor 1880 to the ungrounded terminal of the lamp 1866 and relay 1868.

Each of the following counter and indicator stages is similar to the foregoing except that in the last stage the movable contact of switch 1882 is connected to conductor 1822 which leads to counter pulsing switch 1812. The movable contact of switch 1884 in this final counter and indicator stage is connected by means of conductor 1826 to the switch 1824. The front and rear counter and indicator arrangements are identical.

The operation as the disc 1562 of the control meter 1555 moves upwards over a series of apertures, as for instance over the first three apertures, when the front-rear switches 1844 through 1862 are in the rear position shown in FIGURE 14, is as follows:

In the at-rest position when the control meter 1555 receives no signal the disc 1562 covers the lowermost aperture thereby interrupting the light from the first photocell and causing switch 1834 in block 1800 in FIGURE 14 to close. This energizes the indicator light 1866 and simultaneously energizes relay 1868 to cause switches 1870 and 1872 to close. Switch 1872 connects the ungrounded side of relay 1868 and lamp 1866 through switches 1890 through 1904 and 1884 to the lead 1826 which is connected through switch 1824 to a source of low voltage which keeps the relay 1868 and lamp 1866 energized. The switch 1870 connects the counter 1830 through switches 1876, 1906 through 1918, and 1882 to the conductor 1822 which terminates in switch 1812 which is at this time open. Thus, the counters are not at this moment pulsed.

As the disc 1562 on pointer 1560 moves across the following aperture the switch 1836 in box 1800 in FIGURE 14 is caused to close energizing relay 1878 and indicator lamp 1920. This causes switches 1876 and 1890 to close interrupting the holding circuit through switch 1872 in the first stage and also interrupting the counter circuit through switch 1870 in the first stage so that the first indicating light is extinguished and its associated counter disconnected. Switch 1876 connects counter 1832 through the corresponding following switches 1906 through 1918 and 1882 to the counter pulsing lead 1822 which terminates in open switch 1812.

As the pointer then moves to the next aperture the switch 1838 in box 1800 is closed to energize relay 1922 and indicating lamp 1924. As in the preceding instances this breaks the holding circuit to the preceding lamp and relay to disconnect the preceding counter and extinguish the preceding lamp and also connect counter 1926 through succeeding switches 1908 through 1918 and 1882 to the counter pulsing conductor 1822 which terminates in open switch 1812. The pointer stops its movement at this stage and the operator notes the reading, stops the engine and disconnects the balancing unit. When the balancing unit is disconnected by plug 1522 from receptacle 1508 in the balancing stand 1500 in FIGURE 15, relay 1536 in FIGURES 14 and 15 is de-energized to allow switch 1806 to move to its uppermost position. In this position the switch 1806 connects the condenser 1808, which had previously been charging through switch 1806, to the relay 1810 to momentarily energize that relay. When the relay 1810 is energized switch 1812 is momentarily closed to connect the lead 1822 to a source of counter operating voltage to pulse the particular front and rear counters which are connected thereto. It will be remembered that the third counter 1926 is connected to conductor 1822 and consequently this counter will be caused to advance one count. The momentary energization of relay 1810 connects the condenser 1816 to a supply of positive voltage through the switch 1814 on relay 1810 thus allowing that condenser to charge, and when the relay 1810 is immediately de-energized, the condenser 1816 discharges through switch 1814 and relay 1820 to momentarily close that relay. This opens switch 1824 breaking the holding circuits through conductor 1826 and allowing the lamp 1924 to extinguish and relay 1922 to be de-energized. At the same time switch 1636 is momentarily opened to remove the holding voltage from lead 1634 in the photocell tube stage to cause all photocell tubes 1586 through 1594 to become non-conducting. The unit is then ready for balancing another engine.

*Operation*

In the production line manufacture of engines, such as automobile engines, each engine advances along the conveyor line after its manufacture has been completed and is shunted off of the main conveyor by means of run-off conveyors to be attached to a hot test stand while still on the conveyor. Water, oil and gas conduits are then connected to the engine and the engine is "run-in" for a certain period of time.

After an engine has been properly connected at a hot test stand, an operator with an engine balance classifier connects the distributor lead 1388 thereof to the distributor of the engine and places the probe of the classifier upon either the front or rear of the engine block or oil pan near the crank shaft bearing. The operator then manually operates the engine throttle to bring the engine to the desired balancing speed, for example, 1,500 r.p.m., and moves the switch 1383 to the appropriate front or rear position depending upon the placement of the probe. When the engine is running at the desired speed, as indicated by the engine speed meter 1404 in the classifier, the operator notes from the balance indicator 1386 whether or not that end of the engine is in need of balancing. The classifier is then moved to the other end of the engine and the switch 1383 moved to its other position to indicate whether the other end of the engine is in need of balance. If no balancing is necessary the engine is appropriately marked and proceeds through its run-in period and subsequent processing without further balancing steps. The approximate time utilized in testing with the engine balance classifier is one half of a minute.

If the classifier test indicates that excessive vibration is present in either the front or rear end the classifier operator informs the balancing operator who thereupon connects the front and rear transducers 44 and 68 to the engine block or oil pan at a specific point which is predetermined and constant. The pick-ups must be placed at the same point on each engine in order to allow true production line balancing and to render the various calibrations correct as will be seen hereinafter. The operator also connects the engine distributor and ignition circuit to the test stand as shown in FIGURE 15 and mounts the governor motor 104. The engine is then started.

Assuming that the particular engine under test is the first in a series, that is, is the first engine of a particular type which is going through the assembly line, or is the first being balanced by the equipment, the balancing procedure is as follows. All engine selector switches 143, 145, 503, 505, 553 and 555, are thrown into the number one position and the switches 1952, 1956, 1958, 1970 and 1972 in the calibrator are shifted to their uppermost positions. As soon as the engine analyzer has been turned on and allowed to warm up the lamps 64, 66 and 88 and 90 in the front and rear amplitude channels 10 and 12 indicate which ends of the engine are in need of balancing and which ends are satisfactory. If through inadvertence the operator has failed to place either the front or rear pick-up upon the engine, or if either the front or rear pick-up is not functioning properly, the associated amplitude check channels 36 and 38 maintain the appropriate relay 52 or 76 in a de-energized position so that the lamp 54 or 78 directs the operator to check the rear or front pick-up as the case may be. As long as these lamps are not illuminated the operator knows that the pick-ups are in position on the engine and are functioning properly. In the case where a pick-up is not functioning properly or is not placed upon the engine, not only do the lamps 54 and 78 indicate this condition, but the power to lamps 64, 66, 88 and 90 is cut off by the relays 52 and 76 so that it is impossible to obtain an indication that the engine needs no balancing. It will thus be seen that after the pick-ups are applied to the engine and the analyzer is turned on the operator gets a simultaneous indication as to whether or not the various pick-ups are on the engine or are defective and as to which portions of the engine are in need of balancing.

Referring to FIGURE 1 and more particularly to the block diagram of the governor channel 36a, it is seen that if the engine is running at a speed materially removed from that preset into the governor, either the relay channel 108 or 112, depending on whether the speed is high or low, has actuated its associated relay 1082 or 1172 for a sufficient length of time to allow the condensers 1120 or 1198 to charge sufficiently to cause the relay channel 110 or 114 to energize the relays 116 or 118 to illuminate the lamp 120 to direct the operator to check the distributor and governor. These same relays simultaneously open the contacts 1246 and 1252 in the relay 106 to remove all power from the lamps 54, 64, 66, 78, 88 and 90 so that no erroneous determinations can be made because the engine is off speed.

The operator is now correctly apprised as to which end of the engine needs balancing and reference to the frequency indicating meter 92 shows whether the unbalance is being caused by the crank shaft and its appurtenances. While the vibration caused in most automobile engines is due to unbalance in the crank shaft, the fly wheel, fan belt pulley or other crank shaft appurtenances, there are some isolated instances wherein the maximum vibration is caused by some other agency, such as the oil pump or the water pump. The operator may therefore glance at the frequency meter 92 to make certain that it is reading the operating speed of the engine and if this is so he may safely assume that the vibration is being caused by the crank shaft or its associated fly wheel, pulley and other appurtenances. If the meter 92 reads a different frequency the operator immediately knows that some other agency is causing the maximum amount of vibration and can determine from the frequency indicated what portion of the engine is at fault.

If, as in almost all instances, the vibration is being caused by the crank shaft, the operator next directs his hand unit 26 containing the phase stroboscope 28 and speed stroboscope 30 at the crank shaft at the particular end of the engine to which he has his unit switched. Assuming that this is the rear of the engine, the switch 32 is in the open position shown in FIGURES 1 and 3 and the front-rear relay 14 is also in the position shown. This provides the stroboscope channel 18 with a signal from the tuned amplifier 56 in the amplitude measuring channel 40 over the lead 456 and through contacts 402 and 454 of the front-rear relay 14. The stroboscope channel 18 thus fires the phase stroboscope 28 in synchronism with the vibration of the crank shaft which is at engine speed.

At the same time the timing channel 24 is firing the speed stroboscope 30 at the precise rate at which it is desired that the engine should run, as for example, at a speed of 1,500 r.p.m. The operator now directs the speed stroboscope 30 at the crank shaft and/or fly wheel or fan pulley on the particular end of the engine under observation to determine whether or not the engine is running at the proper test speed. If the moving part being observed appears stationary, the engine is running at precisely the desired speed whereas if the part appears to be moving the engine is either over or under speed.

At the same time as the aforegoing operations are going on the speed channel 20 is actuated by a signal from the distributor to cause the speed meter 94 to give an accurate indication of engine speed. Thus if the speed stroboscope 30 indicates the engine to be off speed, the operator may determine its exact speed by reference to the meter 94. The speed channel 20 and associated relay channel 22 will also cause energization of the relay 96 to prevent firing of the speed stroboscope 30 in the event that the engine is not running, or in the event that the engine speed is excessively low. Under these circumstances the operator cannot observe the engine speed with the speed stroboscope and is informed that corrective measures are necessary before balancing can begin. Although the speed light is off the speed of operation of the engine may still be determined by reference to the speed meter 94.

Once the operator has determined that the engine is operating at the proper speed he may then proceed to the balancing steps. Assuming that the operator has the front-rear switch 32 in an open position so that the front-rear relay 14 is in the position shown in FIGURE 3, the engine is brought to rest and a chalk mark or other reference mark is applied in an optically accessible location, as for instance, to the fan belt pulley. The engine is then started and allowed to come up to the proper speed as indicated by the speed stroboscope 30, and the position of the chalk mark or reference mark is observed under the light of the phase stroboscope 28 and the reading of the amplitude meter 34 is noted.

The first balancing steps are directed at locating the position of unbalance and to this end the engine is stopped and the crank shaft turned over until the chalk mark is in the same position which it occupied during the time it was observed under the light of the phase stroboscope. With the crank shaft in this position a small trial weight, such as a piece of putty, welding rod, etc., is applied to the fan belt pulley at a point in line with the position of the front pick-up. After the trial weight is added, the engine is again run and allowed to come up to proper speed as indicated by the speed stroboscope and the position of the reference mark again noted under the light of the phase stroboscope. If a sufficiently large trial weight has been added the reference mark will have shifted. If the mark shifts to the right or clockwise, this indicates that it is not in the correct location and must be shifted from its present location counterclockwise or to the left. The engine is again stopped and the weight shifted in this manner, that is, counterclockwise if the chalk mark shifted clockwise, or clockwise if the chalk mark shifted counterclockwise.

After the weight has been shifted the engine is again brought to speed as indicated by the speed stroboscope and the position of the reference mark observed under the light of the phase stroboscope. If the trial weight is now in the proper position the reference mark will have shifted to its original location or to a position 180° from this location and the position locating step is completed.

With the engine running at the proper speed and with the phase stroboscope directed at the chalk mark on the fan belt pulley the phase controls for the rear of engine number one, i.e. switch 501 and potentiometer 544 in the phase stroboscope channel 18, are now varied until the position for weight variation is in a location of maximum convenience to the operator. That is to say these phase controls are varied until the spot for weight addition or subtraction is in an easily accessible position. It should be clearly understood that this phase adjustment does not actually shift the point of unbalance but varies the lag between the physical actuation of the pick-up and the firing of the phase light.

If the amplitude meter has been previously calibrated by adding known weights to a balanced engine as described in detail in the section on the calibrator, it will indicate the amount of weight to be added at the now known position and balancing is completed. If the amplitude meter has not had its scale previously calibrated the first engine may be balanced and the scale calibrated as follows: The amount of weight added to the previously ascertained location is varied by the operator until the vibration amplitude is satisfactory as indicated by the lamps 64 and 66. The front end of the engine is now satisfactorily balanced and the operator makes a note of the weight change necessary to do the job.

The operator now knows the amount of weight which must be added to or subtracted from a specific point on the fan belt pulley (or other selected spot on the rear end of the crank shaft) to reduce a certain amplitude of vibration to a satisfactory value. Since the amplitude instrument provides a linear indication it is now calibrated so that subsequent amplitude readings obtained from the front pick-up may immediately be read as the amount of weight necessary to satisfactorily reduce the vibration.

As a further indication of the amount of weight to add the operator may merely consult the indicator lamps in the statistical analyzer unit.

The operator has now determined the position of unbalance and has also determined the amount of weight which must be applied to the rear end of the engine to correct this unbalance. The same procedure is now repeated with the front-rear switch 32 in its closed position and the front-rear relay 14 energized to balance the front end of the engine.

The first engine has now been balanced and the procedure on subsequent engines is considerably simplified according to the invention. Thus, the next engine undergoing run-in, which the classifier has indicated needs balancing, has the pick-ups and governor motor attached thereto and has the speed channel and statistical analyzer connected to the distributor.

The operator then places a chalk mark upon the fan belt pulley or some other convenient location and the engine is brought to speed as indicated by the speed stroboscope. The position of the chalk mark under illumination by the phase strobe lamp and the reading of the amplitude meter or the statistical analyzer indicator lights are noted by the operator and the engine is stopped and the crank shaft manually rotated until the chalk mark appears in the same position as it did under the light of the phase stroboscope. The operator now knows from the amplitude meter reading the weight necessary to achieve balance and applies that weight to the same radial and circumferential spatial position on the fan belt pulley as was used on the first engine. So long as the weight is applied at the same radial distance from the axis of rotation and at the same circumferential position on the same part of the rotor as with the first engine it is unnecessary to make an independent determination of the position of unbalance. The engine may now again be brought to speed so as to obtain a satisfactory indication from the indicator lamps. The same procedure is repeated for the other end of the engine and it is thus completely balanced. The entire time consumed in the process is approximately two minutes.

If, after balancing a number of this first type of engine it is desired to operate on a second type engine, the engine selector switches are thrown to the opposite position and a first engine run is made in the manner just described. After this first engine run has been made for both type engines it is a simple matter to switch from one type engine to another by merely throwing the engine selector switches. Where it is desired to use the analyzer on an even larger number of types of engines in excess of the number of positions of the engine selector switches, resort may be had to the calibrator as described in detail in that section of this specification. In all cases engines may be balanced without repeating the complete initial balancing procedure.

While the unit illustrated in the appended drawings and described in this specification utilizes separate front and rear amplitude channels it will be appreciated that this is not necessary and that a single amplitude channel may be utilized with a suitable switching arrangement.

In certain instances it may also be desirable to manually adjust the engine speed and to this end an additional switching arrangement may be added to insure continued firing of the speed stroboscope.

It will be apparent from the foregoing that an apparatus and method of production balancing mass produced engines has been provided which is markedly different from those utilized heretofore and which results in very large savings in cost, time, labor and floor space.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of production balancing mass produced self-propelled engines having stators and rotors, said rotors being provided with reference marks, with an instrument including a transducer, a stroboscopic lamp and means for firing said lamp in synchronism with the signal produced by said transducer, comprising the steps of; mounting a first engine to permit vibration in a plurality of planes, placing said transducer in a fixed position on the stator of said first engine proximate one end thereof, running said engine under its own power, directing the light from said lamp at the rotor of said first engine at said end, locating the locus of unbalance of said rotor with said transducer in said fixed position, varying the weight of said rotor at a determined point to reduce said unbalance to a satisfactory value, mounting a second engine to permit vibration in a plurality of planes, placing said transducer in a fixed position on the stator of said second engine at the same location as it was placed on said first engine, running said second engine under its own power, directing the light from said lamp at the rotor of said second engine at the end proximate said transducer so as to make said reference mark on said rotor appear stationary at a determined location, stopping said engine, rotating said rotor to place said reference mark at said determined location, and varying the weight of said rotor at the same determined point as on the rotor of said first engine to reduce the unbalance to a satisfactory value.

2. A method of production balancing mass produced self-propelled engines having stators and rotors, said rotors being provided with reference marks, with an instrument including a transducer, a stroboscopic lamp and means for firing said lamp in synchronism with the signal produced by said transducer, comprising the steps of; mounting a first engine to permit vibration in a plurality of planes, placing said transducer in a fixed position on the stator of said first engine proximate one end thereof, running said engine at a fixed speed under its own power, directing the light from said lamp at the rotor of said first engine at said end, locating the locus of unbalance of said rotor, varying the weight of said rotor at a determined point to reduce said unbalance to a satisfactory value, mounting a second engine to permit vibration in a plurality of planes, placing said transducer in a fixed position on the stator of said second engine at the same location as it was placed on said first engine under its own power, running said second engine at said fixed speed, directing the light from said lamp at the rotor of said second engine at the end proximate said transducer so as to make said reference mark on said rotor appear stationary at a determined location, stopping said engine, rotating said rotor to place said reference mark at said determined location, and varying the weight of said rotor at the same specific point as on the rotor of said first engine to reduce the unbalance to a satisfactory value.

3. A method of production balancing mass produced self-propelled engines having stators and rotors, said rotors being provided with reference marks, with an instrument including a transducer, a stroboscopic lamp, means for firing said lamp in synchronism with the signal produced by said transducer, and indicating means for providing an indication which is a function of the amplitude of vibration actuating said transducer, comprising the steps of; mounting a first engine to permit vibration in a plurality of planes, placing said transducer in a fixed position on the stator of said first engine proximate one end thereof, running said engine under its own power so as to cause said lamp to fire and said indicating means to give a certain reading, directing the light from said lamp at the rotor of said first engine at said end, locating the locus of unbalance of said rotor, varying the weight of said rotor at a determined point to reduce said unbalance to a satisfactory value, mounting a second engine to permit vibration in a plurality of planes, placing said transducer in a fixed position on the stator of said second engine at the same location as it was placed on said first engine, running said engine under its own power so as to cause said lamp to fire and said indicating means to give a certain reading, directing the light from said lamp at the rotor of said second engine at the end proximate said transducer so as to make said reference mark on said rotor appear stationary at a determined location, stopping said engine, rotating said rotor to place said reference mark at said determined location, and varying the weight of said rotor at the same determined point as on the rotor of said first engine by an amount determined by the relationship of said certain reading obtained on said first engine and said certain reading obtained on said second engine.

4. A method of production balancing mass produced self-propelled engines having stators and rotors, said rotors being provided with reference marks, with an instrument including a transducer, a stroboscopic lamp, means for firing said lamp in synchronism with the signal produced by said transducer, and indicating means for providing an indication which is a function of the amplitude of vibration actuating said transducer, comprising the steps of; mounting a first engine to permit vibration in a plurality of planes, placing said transducer in a fixed position on the stator of said first engine proximate one end thereof, running said engine under its own power at a fixed speed so as to cause said lamp to fire and said indicating means to give a certain reading, directing the light from said lamp at the rotor of said first engine at said end, locating the locus of unbalance of said rotor, varying the weight of said rotor at a determined point to reduce said unbalance to a satisfactory value, mounting a second engine to permit vibration in a plurality of planes, placing said transducer in a fixed position on the stator of said second engine at the same location as it was placed on said first engine, running said second engine under its own power at said fixed speed so as to cause said lamp to fire and said indicating means to give a certain reading, directing the light from said lamp at the rotor of said second engine at the end proximate said transducer so as to make said reference mark on said rotor appear stationary at a determined location, stopping said engine, rotating said rotor to place said reference mark at said determined location, and varying the weight of said rotor at the same determined point as on the rotor of said first engine by an amount determined by the relationship of said certain reading obtained on said first engine and said certain reading obtained on said second engine.

5. A method of production balancing mass produced self-propelled engines having stators and rotors, said rotors being provided with reference marks, with an instrument including a transducer, a stroboscopic lamp, means for firing said lamp in synchronism with the signal produced by said transducer, and indicating means for providing an indication which is a function of the amplitude of vibration actuating said transducer, comprising the steps of; mounting a first engine to permit vibration in a plurality of planes, placing said transducer in a fixed position on the stator of said first engine proximate one end thereof, running said engine under its own power at a fixed speed so as to cause said lamp to fire and said indicating means to give a certain reading, directing the light from said lamp at the rotor of said first engine at said end, locating the locus of unbalance of said rotor, varying the weight of said rotor at a determined point to reduce said unbalance to a satisfactory value, mounting a second engine to permit vibration in a plurality of planes, placing said transducer in a fixed position on the stator of said second engine at the same location as it was placed on said first engine, running said second engine under its own power at said fixed speed so as to cause said lamp to fire and said indicating means to give a certain reading, directing the light from said lamp at the rotor of said second engine at the end proximate said transducer so as to make said reference mark on said rotor appear stationary at a determined location, stopping said engine, rotating said rotor to place said reference mark at said determined location, and varying the weight of said rotor at the same determined point as on the rotor of said first engine by an amount determined by the relationship of said certain reading obtained on said first engine and said certain reading obtained on said second engine.

6. A method of production balancing mass produced self-propelled engines having stators and rotors, said rotors being provided with reference marks, with an instrument including a transducer, a stroboscopic lamp, means for firing said lamp in synchronism with the signal produced by said transducer, and indicating means for providing an indication which is a function of the amplitude of vibration actuating said transducer, comprising the steps of; mounting a first engine to permit vibration in a plurality of planes, placing said transducer in a fixed position on the stator of said first engine proximate one end thereof, running said engine at a fixed speed so as to cause said lamp to fire and said indicating means to give a certain reading, directing the light from said lamp at the rotor of said first engine at said end, locating the locus of unbalance of said rotor with said transducer in said fixed position, varying the phase of the flashes of light from said lamp with respect to the signal produced by said transducer to locate the point at which weight must be varied in an easily accessible position, varying the weight of said rotor at the determined point to reduce said unbalance to a satisfactory value, mounting a second engine to permit vibration in a plurality of planes, placing said transducer in a fixed position on the stator of said second engine at the same location as it was placed on said first engine, running said second engine under its own power at said fixed speed so as to cause said lamp to fire and said indicating means to give a certain reading, directing the light from said lamp at the rotor of said second engine at the end proximate said transducer so as to make said reference mark on said rotor appear stationary at a determined location, stopping said engine, rotating said rotor to place said reference mark at the determined location, and varying the weight of said rotor at the determined point as on the rotor of said first engine by an amount determined by the relationship of said certain reading obtained on said first engine and said certain reading obtained on said second engine.

7. In a vibration analyzer for use on a running engine, a transducer, an untuned amplifier conected to said transducer for amplifying a range of frequencies, a first relay having a first set of contacts, means for energizing said first relay when the signal from said untuned amplifier exceeds a preset minimum, an indicator connected to said first set of contacts for energization when said first relay is deenergized and deenergization when said relay is energized to provide an indication of when such transducer produces a signal, a tuned amplifier connected to said transducer, a second relay having a second set of contacts, means for energizing said second relay when the signal from said tuned amplifier exceeds a preset maximum, a pair of indicators connected to said second set of contacts for alternate energization when said second relay is energized and deenergized to indicate an acceptable and an unacceptable vibration level, and circuitry connecting said first and second sets of contacts for preventing energization of said pair of indicators when said first relay is deenergized.

8. An engine analyzer for analyzing and balancing engines having rotors at a preset speed comprising in combination; a plurality of transducers for attachment to said engine, indicating means connected to and actuated by said transducers for indicating which portions of an engine under test are vibrating excessively, a stroboscopic lamp, means selectively connected to said transducers for firing said lamp under the control of a selected transducer in response to vibration caused by said rotor, means for indicating the amplitude of the vibration actuating the selected transducer, an engine throttle actuating motor, and governor means connected to said motor for controlling the speed of said engine and tending to maintain it at said preset value, said governor means including frequency sensitive electrical means for disabling said stroboscopic lamp when said speed is removed from said preset speed by an amount two rotations per minute.

9. A device as set out in claim 8 wherein said disabling means comprises a meter movement energizing coil, a source of constant frequency voltage connected to one terminal of said coil, a source of voltage derived from the distributor of the engine under test connected to another terminal of said coil, a meter movement controlled by said coil, photoelectric means associated with said meter movement so that illumination of said photoelectric means is controlled by the position of said meter movement, and switching means controlled by said photoelectric means for disabling said stroboscopic lamp.

10. An engine analyzer for analyzing and balancing mass produced engines having rotors comprising in combination; at least one transducer for attachment to said engine, a stroboscopic lamp, means connected to said transducer for firing said lamp under the control of the rotor vibration of said engine, means for indicating the amplitude of vibration actuating the transducer, first means for counting the number of engines to which the analyzer is connected, second means for counting the number of engines run after being connected to the analyzer, and third means for counting the number of engines which are out of balance by a plurality of preset amounts, said third means comprising, a first series of relays, means responsive to the amplitude of vibration actuating the transducer for energizing said relays in sequence in response to an increasing amplitude of vibration so that only one relay is energized at a time, a first series of switches controlled by said relays, a second series of relays controlled by said first series of switches so that only one relay is energized at a time, a second series of switches controlled by said second series of relays, a series of counters controlled by said second series of switches, and a source of voltage connected to the last switch in said second series of switches for actuating the counter corresponding to the energized relay in said second series of relays.

11. A method of production balancing mass produced self-propelled engines having stators and rotors, said rotors being provided with reference marks, with an instrument including a transducer and a means controlled by said transducer for providing an indication of the locus of an unbalance mass in the rotor with respect to a fixed position on the stator of the engine, comprising the steps of; mounting a first engine to permit vibration in a plurality of planes, placing said transducer in a fixed position on the stator of said first engine, running said engine under its own power, locating the locus of said unbalance mass by means of said transducer in said fixed position, said reference mark and said indicating means, varying the weight of said rotor at a determined point to reduce said unbalance to a satisfactory value, mounting a second engine to permit vibration in a plurality of planes placing said transducer in a fixed position on the stator of said second engine at the same relative location as it was placed on said first engine, running said second engine under its own power, locating the position of the reference mark on the rotor of said second engine with respect to said fixed position while said engine is running under its own power, stopping said engine, rotating said rotor to place and reference mark at said fixed position and varying the weight of said rotor at the same determined point as on the rotor of said first engine to reduce the unbalance to a satisfactory value.

12. A method of production balancing mass produced self-propelled engines having stators and rotors, said rotors being provided with reference marks, with an instrument including a transducer, comprising the steps of; mounting a first engine to permit vibration in a plurality of planes placing said transducer in a fixed position on the stator of said first engine, running said engine under its own power, locating by means of said fixed positioned transducer and said reference mark the instantaneous locus of the reference mark on said rotor with respect to a fixed position on said stator while said engine is running, stopping said engine, varying the weight of said rotor at a determined point to reduce the unbalance thereof to a satisfactory value, mounting a second engine to permit vibration in a plurality of planes, placing said transducer in a fixed position on the stator of said second engine at the same relative location as it was placed on said first engine, running said engine under its own power, locating the instantaneous locus of the reference mark on said rotor with respect to said fixed position while said engine is running by means of said fixed positioned transducer, stopping said engine, rotating said rotor to place reference mark at said indicated instantaneous locus and varying the weight of said rotor at the same determined point as on the rotor of said first engine to reduce the unbalance to a satisfactory value.

13. A method of production balancing self-propelled engines having stators and rotors by means of a device whose input is supplied by a transducer which produces a periodic signal comprising the steps of; mounting a first engine to permit vibration in a plurality of planes, placing said transducer in a fixed position on the stator of said first engine, running said first engine under its own power, locating the relative position of the rotor of said engine with respect to the stator of said engine at a specific point of said periodic signal, locating the position of an unbalance mass on said rotor when said rotor is in a known position with respect to said relative position by means of said fixed positioned transducer, varying the weight of said rotor at a determined point with respect to said known position to secure a satisfactory balance of said rotor, mounting a second engine to permit vibration in a plurality of planes, placing said transducer in a fixed position on the stator of said second engine at the same relative position that it was placed on said first engine, running said engine under its own power, locating the relative position of the rotor of said engine with respect to the stator of said engine at the same specific point of said periodic signal, placing the rotor of said second engine in said relative position, and varying the weight of said rotor of said second engine at the determined point determined by said first engine to balance said rotor.

14. An engine analyzer comprising in combination; a transducer for attachment to an engine to be analyzed, a stroboscopic lamp, means actuated by said transducer for firing said lamp under control of the vibration of said engine, and means for disabling said lamp to prevent it from firing when the speed of said engine differs by a fixed amount from a preset value in order to cause said lamp to fire in bursts when the speed of said engine is substantially at a preset value, said disabling means comprising a meter movement energizing coil, a source of constant frequency voltage connected to one terminal of said coil, a source of voltage derived from the distributor of the engine under test connected to another terminal of said coil, a meter movement controlled by said coil, photoelectric means associated with said meter movement so that illumination of said photoelectric means is controlled by the position of said meter movement, and switching means controlled by said photoelectric means for disabling said stroboscopic lamp.

References Cited in the file of this patent

UNITED STATES PATENTS

| | | |
|---|---|---|
| 1,820,272 | Gumper | Aug. 25, 1931 |
| 2,164,114 | Kolb | June 27, 1939 |
| 2,165,024 | Baker et al. | July 4, 1939 |
| 2,372,419 | Ford et al. | Mar. 27, 1945 |
| 2,377,349 | MacKenzie | June 5, 1945 |
| 2,383,588 | Bousky | Aug. 28, 1945 |
| 2,383,984 | Oberweiser | Sept. 4, 1945 |

(Other references on following page)

UNITED STATES PATENTS

| | | |
|---|---|---|
| 2,394,482 | Reynolds | Feb. 5, 1946 |
| 2,416,181 | King | Feb. 18, 1947 |
| 2,481,112 | Hanley | Sept. 6, 1949 |
| 2,483,394 | Barker | Oct. 4, 1949 |
| 2,521,141 | Allen | Sept. 5, 1950 |
| 2,628,606 | Draper et al. | Feb. 17, 1953 |
| 2,651,937 | Martin et al. | Sept. 15, 1953 |
| 2,656,710 | Weaver et al. | Oct. 27, 1953 |
| 2,663,184 | Merrill et al. | Dec. 22, 1953 |
| 2,667,780 | Van Valkenburg | Feb. 2, 1954 |
| 2,677,788 | Germhausen | May 4, 1954 |
| 2,709,076 | Hansen | May 24, 1955 |
| 2,711,647 | Ongaro et al. | June 28, 1955 |
| 2,740,297 | Phelps | Apr. 3, 1956 |
| 2,741,992 | Glazerbrook | Apr. 17, 1956 |
| 2,773,389 | King | Dec. 11, 1956 |
| 2,805,576 | Rambo | Sept. 10, 1957 |
| 2,816,445 | Rambo | Dec. 17, 1957 |

FOREIGN PATENTS

| | | |
|---|---|---|
| 643,986 | Great Britain | Oct. 4, 1950 |
| 712,481 | Great Britain | July 28, 1954 |
| 726,107 | Great Britain | Mar. 16, 1955 |

UNITED STATES PATENT OFFICE
CERTIFICATE OF CORRECTION

Patent No. 3,023,613            March 6, 1962

Arthur R. Crawford

It is hereby certified that error appears in the above numbered patent requiring correction and that the said Letters Patent should read as corrected below.

Column 3, line 36, for "untis" read -- units --; column 11, line 29, for "is turn in grounded" read -- in turn is grounded --; column 16, line 47, for "566" read -- 556 --; column 26, line 65, after "long" insert -- as --; column 27, line 2, for "transformer" read -- transformers --; line 55, for "when" read -- which --; column 40, line 39, for "conected" read -- connected --; column 41, line 61, for "and" read -- said --; column 42, line 13, after "place" insert -- said --.

Signed and sealed this 30th day of April 1963.

(SEAL)
Attest:

ERNEST W. SWIDER
Attesting Officer

DAVID L. LADD
Commissioner of Patents